United States Patent
Amundsen et al.

(10) Patent No.: US 7,286,938 B2
(45) Date of Patent: Oct. 23, 2007

(54) METHOD OF AND AN APPARATUS FOR PROCESSING SEISMIC DATA

(75) Inventors: Lasse Amundsen, Trondheim (NO);
Egil Holvik, Trondheim (NO); Johan Robertsson, Fulbourn (GB)

(73) Assignee: WesternGeco, L.L.C., Houston, TX (US)

( * ) Notice: Subject to any disclaimer, the term of this patent is extended or adjusted under 35 U.S.C. 154(b) by 0 days.

(21) Appl. No.: 10/492,762

(22) PCT Filed: Oct. 28, 2002

(86) PCT No.: PCT/IB02/05056

§ 371 (c)(1),
(2), (4) Date: Dec. 2, 2004

(87) PCT Pub. No.: WO03/036331

PCT Pub. Date: May 1, 2003

(65) Prior Publication Data

US 2005/0090987 A1    Apr. 28, 2005

(30) Foreign Application Priority Data

Oct. 26, 2001 (GB) .................................. 0125789.8

(51) Int. Cl.
*G01V 1/28* (2006.01)
*G01V 1/38* (2006.01)

(52) U.S. Cl. .......................................... 702/14; 367/24

(58) Field of Classification Search ................ 702/14, 702/17; 367/14, 37, 38, 21, 24; 703/10, 703/5; 73/1.85; 181/113, 122
See application file for complete search history.

(56) References Cited

U.S. PATENT DOCUMENTS

| | | | | |
|---|---|---|---|---|
| 4,648,080 A | * | 3/1987 | Hargreaves | 367/20 |
| 4,729,101 A | * | 3/1988 | Hanson et al. | 702/14 |
| 4,752,916 A | | 6/1988 | Loewenthal | 367/24 |
| 5,051,961 A | | 9/1991 | Corrigan et al. | 367/24 |
| 5,247,486 A | * | 9/1993 | Regnault | 367/23 |
| 5,400,299 A | * | 3/1995 | Trantham | 367/38 |
| 6,101,448 A | * | 8/2000 | Ikelle et al. | 702/17 |

(Continued)

FOREIGN PATENT DOCUMENTS

GB    2 304 895    3/1997

(Continued)

OTHER PUBLICATIONS

Osen et al., Removal of Water-Layer Multiples from Multicomponent Sea-Bottom Data, May-Jun. 1999, Geophysics, vol. 64, No. 3, pp. 838-851.*

(Continued)

*Primary Examiner*—John Barlow
*Assistant Examiner*—Toan M. Le
(74) *Attorney, Agent, or Firm*—Liangang (Mark) Ye; Jeffrey E. Griffin

(57) ABSTRACT

A method is provided of processing multi-component seismic data acquired by emitting multi-component seismic energy at a source location and acquiring seismic data at a multi-component seismic receiver located at a greater depth than the source location. The seismic data are decomposed into up-going constituents and down-going constituents. A de-signature and de-multiple operator is calculated from the down-going constituents of the seismic data and from properties of the medium surrounding the receiver.

28 Claims, 12 Drawing Sheets

Flow chart of a demultiple, designature and wavefield decomposition method described in the present invention

U.S. PATENT DOCUMENTS

| | | | |
|---|---|---|---|
| 6,256,589 B1 * | 7/2001 | Gallotti Guimaraes | 702/18 |
| 6,574,563 B1 * | 6/2003 | Nickel | 702/14 |
| 6,611,764 B2 * | 8/2003 | Zhang | 702/18 |
| 6,834,235 B2 * | 12/2004 | Muijs et al. | 702/14 |

FOREIGN PATENT DOCUMENTS

| | | |
|---|---|---|
| GB | 2 307 554 | 5/1997 |
| WO | WO 96/20417 | 7/1996 |

OTHER PUBLICATIONS

Amundsen et al., Extraction of P- and S-Waves from the Vertical Component of the Particle Velocity at the Sea Floor, Jan.-Feb. 1995, Geophysics, vol. 60, No. 1, pp. 231-240.* van Borselen et al., Removal of Surface-Related Wave Phenomena-The Marine Case, Jan.-Feb. 1996, Geophysics, vol. 61, No. 1, pp. 202-210.*

Holvik and Amundsen, "Decomposition of multicomponent sea floor data into primary PP, PS, SP, and SS wave responses," SEG 1998 Annual Meeting, the Society of Exploration Geophysicists, URL:http://www.seg.org/meetings/past/seg1998/techprog/tecprogw.html.

International Search Report dated Apr. 2, 2003, for International Application No. PCT/IB02/05056.

UK Search Report dated Jun. 25, 2002, for Application No. GB 0125789.8.

* cited by examiner

Flow chart of a demultiple, designature and wavefield decomposition method described in the present invention

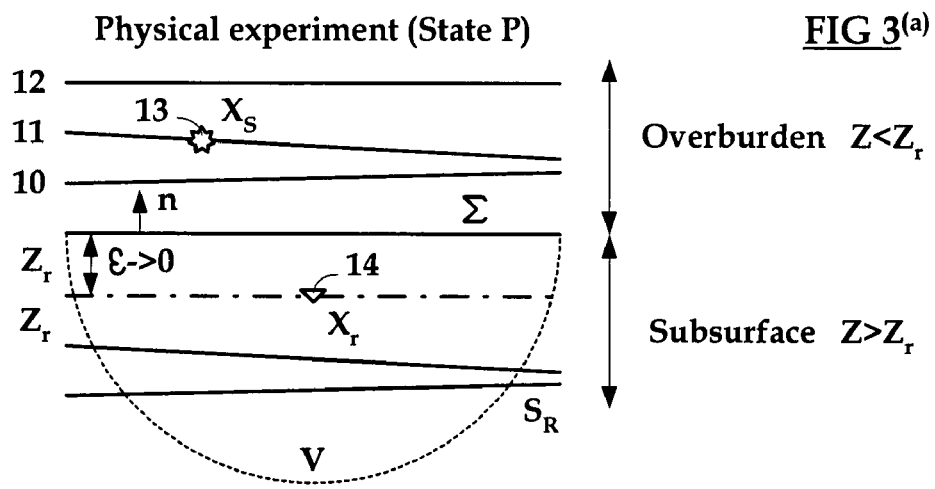
Physical experiment (State P) — FIG 3(a)
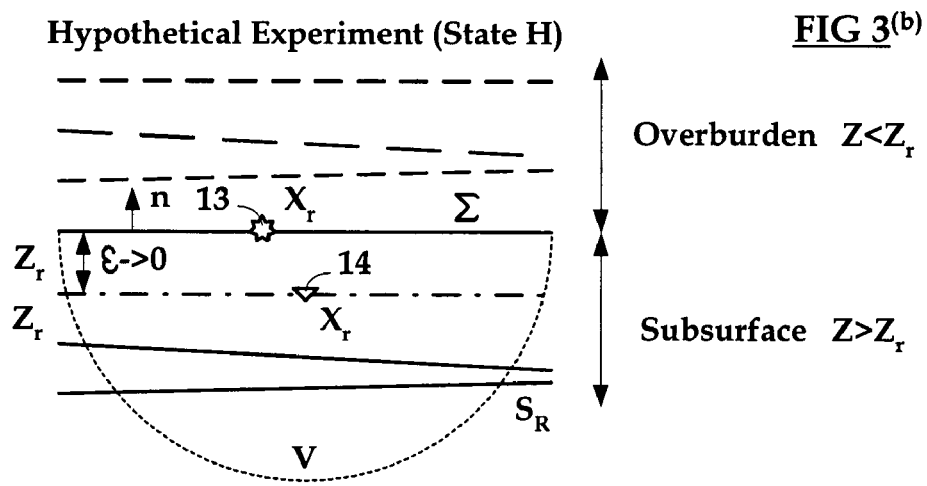
Hypothetical Experiment (State H) — FIG 3(b)
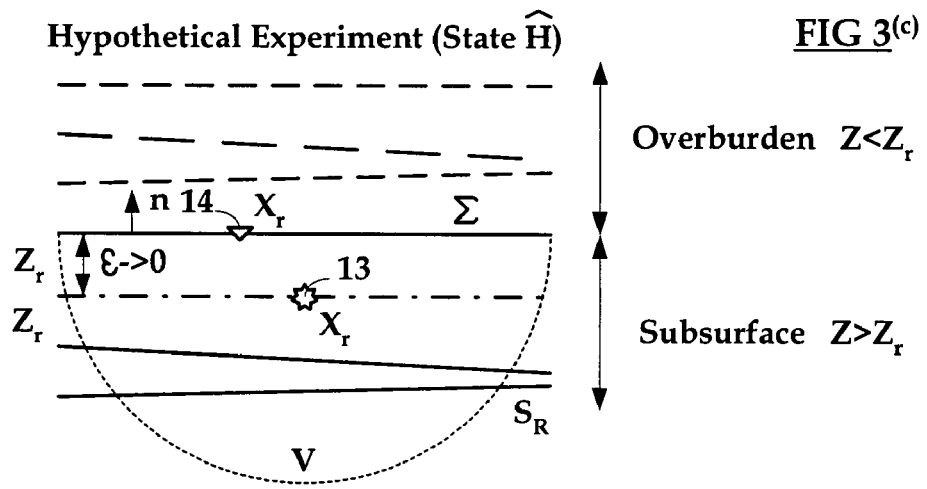
Hypothetical Experiment (State $\widehat{H}$) — FIG 3(c)

2D Visualization of the physical and hypothetical land seismic experiments.

2D Visualization of the physical and hypothetical ocean bottom seismic experiments.

2D Visualization of the physical and hypothetical
seismic experiments with receivers deployed into the earth.
The sources are located anywhere above the receivers.

Particle velocities with free-surface present
Raw data (2C source and 2C receiver)
generated using a reflectivity code (Kennett, 1983)

Upgoing constituents of particle velocities
with free-surface present
Up-going part of raw data. Output of up/down separation step.

Downgoing constituents of particle velocities
with free-surface present
Down-going part of raw data. Output of up/down separation step.

Particle Velocities with free-surface absent
Particle velocities after applying the present invention
to remove the effects of the free surface PP, SP, PS, SS Wavefields with free-surface absent
PP, SP, PS and SS wavefields after applying the present invention to decompose particle velocities on the receiver and source side into P-wave and S-wave receivers and sources.

METHOD OF AND AN APPARATUS FOR PROCESSING SEISMIC DATA

BACKGROUND OF THE INVENTION

1. Field of the Invention

The present invention relates to a method of processing seismic data, in particular multicomponent seismic data, to remove unwanted events from the acquired data. It also relates to an apparatus for processing seismic data. It also relates to a method of and an apparatus for calculating a de-signature and de-multiple operator or a de-signature operator.

2. The Related Art

FIG. 1(a) is a schematic illustration of the principles of a seismic survey. This seismic survey is intended to provide information about a target geological reflector 3 disposed within the earth's interior.

The seismic survey shown in FIG. 1 includes a seismic source 4 disposed on the earth's surface 1. A seismic sensor 5, referred to hereinafter as a "receiver", is also disposed on the earth's surface, at a distance from the seismic source 4. In use, the seismic source 4 is caused to actuate a pulse of seismic energy, and emitted seismic energy is detected by the receiver 5.

FIG. 1(a) illustrates a land-based seismic survey. However, seismic surveying of this general type is not restricted to land, and may be carried out in a marine environment or in the land-sea transition zone. For example, marine seismic surveying arrangements are known in which one or more seismic sources are towed by a survey vessel; in such an arrangement, the receivers may be disposed on the sea-bed (a so-called "ocean bottom cable" survey or OBC survey), or the receivers may also be towed by a survey vessel. Furthermore, a land-based seismic survey is not limited to the configuration shown in FIG. 1(a), and it is possible for the seismic source or the seismic receiver to be disposed within the earth's surface. For example, in a vertical seismic profile (VSP) seismic survey a seismic source is placed on the earth's surface and a receiver is disposed within the earth's interior in a bore hole. In a reverse VSP survey a seismic source is disposed within a bore hole, and a receiver is disposed on the earth's surface.

Only one seismic source 4 and one seismic receiver 5 are shown in FIG. 1(a) for ease of explanation but, in general, a practical seismic survey will contain an array of sources and an array of receivers.

One problem that arises in seismic surveying is that seismic energy may travel from the source to the receiver along many paths. One reason for this is that many other reflectors exist within the earth in addition to the target reflector. In FIG. 1(a) this is illustrated schematically by a reflector 2 that overlies the target reflector 3. These additional reflectors generate paths of seismic energy from the source to the receiver that involve a reflection at a reflector other than the target reflector. Another reason for the existence of multiple paths of seismic energy is that seismic energy that is propagating upwardly within the earth will undergo reflection at the earth's surface 1, owing to the different seismic properties of the earth and the air. This leads to the existence of paths of seismic energy from the source to the receiver that involve more than a single reflection at the target reflector. These paths give rise to unwanted events in seismic data acquired at the receiver. An event in acquired seismic data that relates to seismic energy that has undergone multiple reflections will hereinafter be referred to a "multiple event".

FIG. 1(a) illustrates the primary path of seismic energy for this surveying arrangement, in which the path of seismic energy from the source 4 to the receiver 5 involves only a single reflection, at the target reflector 3. (Refraction at the overlying reflector 2 has been omitted from FIG. 1(a) for clarity.) Although seismic energy propagating along the primary path passes through the overlying reflector 2 on its downwards path from the source 4 to the target reflector 3, and again on its upwards path from the target reflector 3 to the receiver 5, the primary path does not involve reflection at the overlying reflector 2. In an ideal seismic survey, only seismic energy that travelled along the primary path would be detected by the receiver 5.

In a practical seismic survey, the receiver 5 will detect seismic energy that has travelled from the source 4 along many paths other than the primary path. Examples of these other paths of seismic energy are shown in FIG. 1(b) to 1(d). FIGS. 1(b) to 1(d) illustrate paths of seismic energy that involve more than one reflection, and these are known as "multiple events". In FIG. 1(b) downwardly propagating seismic energy from the source 4 is reflected by the overlying reflector 2 so that it travels upwards to the earth's surface 1. The seismic energy is further reflected downwards at the earth's surface, and is then incident on the target reflector. An event of this general type is known as a "source-leg multiple", since the additional reflections occur in the path of seismic energy from the source to the target reflector.

FIG. 1(c) illustrates a seismic energy path in which the seismic energy travels direct from the source to the target reflector 3, and is reflected upwards at the target reflector 3. However, the reflected seismic energy is not incident direct on the receiver, but is reflected downwards at the earth's surface, and is then reflected upwards at the overlying reflector 2 before reaching the receiver. A seismic path of this type is known as a "receiver-leg multiple", since the additional reflections occur on the path of seismic energy from the target reflector to the receiver.

FIG. 1(d) illustrates a seismic path in which seismic energy from the source is incident on the target reflector 3, is reflected upwards to the earth's surface, is reflected downwardly and undergoes a further reflection at the target reflector 3 before reaching the receiver. In this seismic energy path, the additional paths occur between the path of seismic energy from the source to the target reflector and the path of energy from the target reflector to the receiver.

The seismic energy acquired at the receiver in a practical seismic survey will include events corresponding to the desired primary path 1(a), but will also contain events relating to unwanted multiple paths such as the paths shown in FIGS. 1(b) to 1(d). In order to provide accurate information about the target reflector it is desirable to be able to identify and remove multiple events from the seismic energy acquired at the receiver.

The seismic sources used in a land-based survey are normally vibrated or explosive sources. If vibrators are used it is possible to perform a multi-component survey, using a multi-component vibrator that produces three orthogonal source motions (two in orthogonal horizontal directions and one in the vertical direction). If a seismic receiver is used that can record particle motion in three orthogonal directions, then it is possible to perform a 3C×3C (or 9C) seismic survey. A suitable receiver for this is one that can measure three orthogonal components of the particle motion at the receiver, for example a receiver that contains three orthogonal geophones—two geophones for measuring two orthogonal horizontal components of the particle motion at the receiver, and a third geophone for measuring the vertical component of the particle motion at the receiver.

A further problem in analysing the results of a seismic survey is that multi-component vibrators, which operate by imposing tractions on the earth's surface, emit three distinct wave types, known as P-, Sv- and Sh-waves (P-waves are pressure waves, and Sv and Sh waves are shear waves). The relative amplitudes of these different wave-types in seismic energy emitted by a multi-component vibrator vary depending on the direction of propagation of the seismic energy. A multi-component receiver records the three wave types, with a sensitivity that depends on the angle of incidence of the received seismic energy. When a geophone measures a component of the wavefield at the earth's surface, both P-waves and the two-types of S-waves are recorded without distinction.

This is illustrated schematically in FIG. 4(a). FIG. 4(a) shows a land-based seismic survey in which a three-component seismic source 4—in this case a multi-component vibrator—and a three-component seismic receiver 5 are disposed on the earth's surface. As indicated in FIG. 4(a), the seismic source 4 emits both P waves and S waves (only one S-wave type is shown for clarity), and the receiver 5 detects both P-waves and S-waves. The four views in FIG. 4(a) show, from left to right:

(i) Seismic energy generated by a horizontal source motion at the vibrator 4, and being received by a horizontally-oriented geophone at the receiver 5;
(ii) Seismic energy being generated by a horizontal source motion at the vibrator 4, and being detected by a vertically-oriented geophone at the receiver 5;
(iii) Seismic energy being generated by a vertical source motion at the vibrator 4 and being detected by a horizontally-oriented geophone at the receiver 5; and
(iv) Seismic energy being generated by a vertical source motion at the vibrator 4 and being detected by a vertically-oriented geophone at the receiver 5.

FIG. 4(a) illustrates only one horizontal component and one vertical component of the source motion at the vibrator 4 and one horizontal geophone component and one vertical geophone component at the receiver 5. As noted above, in a full multi-component survey the vibrator 4 will further generate seismic energy by a source motion out of the plane of the paper, and the receiver will further comprise a third geophone that detects the particle motion along a line out of the plane of the paper. In total, thus, there are 9 combinations produced by the three orthogonal source motions generated at the source and the three orthogonal geophones at the receiver.

As noted above, many seismic receivers record P- and S-waves without distinction, so that a seismic trace acquired at the receiver will includes events due to received P-waves and events due to received S-waves. In many cases it is desirable to separate the P-events in a seismic trace from the S-events, since this provides additional information about the earth's interior. In many cases, a geological structure will have a different effect on P-waves than on S-waves. The process of separating the P-events in a seismic trace from the S-events is generally referred to as decomposing the seismic trace into its P- and S-components.

There are a number of prior art approaches to decomposing seismic energy acquired at a receiver into P-components and S-components. There are also a number of prior approaches to eliminating the effect of multiple reflections from the acquired seismic data.

For land-seismic data, C. P. A. Wapenaar et al, in "Decomposition of multicomponent seismic data into primary P- and S-wave responses", Geophys. Prosp. Vol. 38, pp 633-661 (1990) and P. Herrmann, in "Decomposition of multicomponent measurements into P- and S-waves", Ph.D. thesis, Delft University of Technology (1992) have given an elastic decomposition scheme which decomposes data both at the receiver side (common shot gather) and at the source side (common receiver gather). The wave field decomposition applied to a common source gather along the receiver line replaces the original particle velocity detectors by pure P- and S- wave detectors. The wave field decomposition applied to a common receiver gather similarly replaces the original vibrator sources by pure P- and S-wave sources. Thus, the total decomposition scheme provides 9 different data sets: P, Sv and Sh processed gathers from simulated P, Sv and Sh sources.

After the wave field decomposition, Wapenaar et al (1990, supra) apply an inverse scheme that eliminates the response of the earth's surface from the decomposed results. In this technique, the earth's surface is assumed to be an interface between a solid and a vacuum. Eliminating the response of the earth's surface eliminates all multiple paths that involve reflection at the earth's surface from the decomposed data, so giving the primary P- and S-wave responses of the earth's interior.

This prior technique requires that the seismic sources are point sources and have a known wavelet or have a wavelet that can be estimated from the acquired data. The above prior art technique has been generalised by E. Holvik and L. Amundsen, in "decomposition of multi component sea floor data into primary PP, PS, SP, and SS wave responses", Expanded Abstracts of 68$^{th}$ Annual Int Mtg of Society of Exploration Geophysicists, pp 2040-2043 (1998), to the case of a marine seismic survey in which ideal vibrators (traction sources) and geophones are deployed at the sea floor. This technique relates to decomposing the acquired data, and removing events arising to reflections within the water layer.

A further prior art technique has been developed by K. Matson and A. Weglein, in "Removing of elastic interface multiples from land and ocean bottom seismic data using inverse scattering" in Expanded Abstracts of 66th Annual Int Mtg of Society of Acceleration of Geophysicists, pp 1526-1529 (1996), and by K. Matson in "An inverse scattering series method for attenuating elastic multiples from multi-component land and ocean bottom seismic data", Ph.D. thesis, University of British Columbia (1997). In this technique, inverse scattering series are used to develop elastic schemes that attenuate multiple reflections from multi-component land or ocean bottom seismic data.

The techniques developed by Holvik and Amundsen and by Matson and Weglein again require that the seismic sources must be point sources with a wavelet that is known or that can be estimated from the acquired data.

L. Amundsen has proposed, in "Geophysics" Vol 66 pp 327-341 (2001), a method of eliminating free-surface multiples from marine seismic data acquired using a multicomponent seismic receiver disposed in the water column or on the sea-bed. However, this method does not remove the effects of multiple reflections associated with the sea-bed.

SUMMARY OF THE INVENTION

A first aspect of the present invention provides a method of processing multi-component seismic data, the data having been acquired by emitting multi-component seismic energy at a source location; and acquiring seismic data at a multi-component seismic receiver located at a greater depth than the source location, the method comprising the steps of:

decomposing the acquired seismic data into up-going constituents and down-going constituents; and calculating a de-signature and de-multiple operator from the down-going constituents of the acquired seismic data and from properties of the medium surrounding the receiver.

The de-signature and de-multiple operator of the invention is effective at attenuating or completely removing the effects of the overburden from the seismic data. It is effective at removing from the seismic data all multiple reflections associated with any interface above the level of the receiver or with any interface. at the receiver level. (The term "interface" covers any discontinuity in acoustic or elastic properties that causes partial reflection of seismic energy.)

It is also effective at attenuating or completely removing the effects of the source radiation characteristics (or the source "signature") from the data.

The method may comprise processing the acquired seismic data using the de-signature and de-multiple operator thereby to attenuate or remove seismic events arising from multiple reflections. This may be done by processing the up-going constituents of the acquired seismic data using the de-signature and de-multiple operator. Alternatively, the de-signature and de-multiple operator may be applied to the complete (that is, undecomposed) acquired seismic data.

The step of processing the acquired seismic data may comprise selecting a desired seismic signature for the source.

The method may further comprise decomposing the seismic data into P-wave and/or S-wave data. This decomposition step may be performed on the de-signatured, de-multipled data. Alternatively, the acquired data may be decomposed into P-wave and/or S-wave data before the de-signature and de-multiple operator is applied.

The decomposition into P-wave and/or S-wave data may be a receiver-side decomposition and/or a source-side decomposition.

A second aspect of the invention provides a method of processing multi-component seismic data, the data having been acquired by emitting multi-component seismic energy at a source location; and acquiring seismic data at a multi-component seismic receiver located at a greater depth than the source location, the method comprising the steps of:

decomposing the acquired seismic data into up-going constituents and down-going constituents; and calculating a de-signature operator from the initial down-going constituents of the acquired seismic data and from properties of the medium surrounding the receiver.

The initial down-going constituents of the seismic data acquired at the receiver relate to seismic energy that has travelled direct from the source to the receiver without undergoing any reflection. They may therefore be used to calculate a de-signature operator for attenuating or eliminating the effects of the radiation characteristics of the seismic source on the acquired data.

The methods of the invention may be applied to pre-existing seismic data. Alternatively, the method may further comprises the steps of: emitting multi-component seismic energy at a source location; and acquiring seismic data at a multi-component seismic receiver located at a greater depth than the source location.

Other aspects of the invention are claimed in independent claims 13, 16, 25, 27, and 24.

BRIEF DESCRIPTION OF THE DRAWINGS

Preferred embodiments of the present invention will now be described by way of illustrative example with reference to the accompanying figures in which:

FIGS. 1(*b*), 1(*c*) and 1(*d*) are schematic views of a seismic survey showing three undesired paths of seismic energy;

FIG. 3(*a*) is a schematic view of a real seismic survey;

FIG. 3(*b*) shows a hypothetical seismic survey corresponding to the seismic survey of FIG. 3(*a*);

FIG. 3(*c*) shows a further hypothetical seismic survey that is a reciprocal of the hypothetical seismic survey shown in FIG. 3(*b*);

DETAILED DESCRIPTION OF THE INVENTION

Figure 1A:
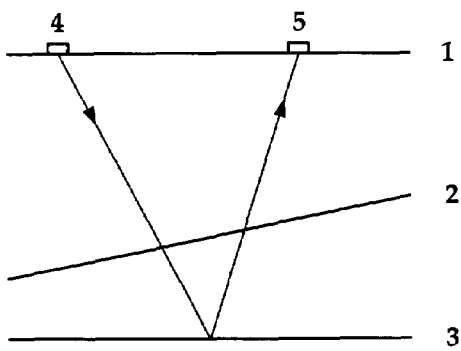
FIG. 1(*a*) is a schematic view of a seismic survey showing the desired path of seismic energy.

The principle of one method of obtaining a de-signature and de-multiple operator of the present invention is illustrated in FIGS. 3(*a*) to 3(*c*). FIG. 3(*a*) illustrates an actual seismic survey. This seismic survey comprises a receiver $x_r$ (14) that is located at a depth $z_r$. The medium within which the seismic survey is carried out is classified into the overburden for all depths less than the receiver depth (that is for all $z<z_r$), and as the sub-surface for depths greater than the depth of the receiver (that is, for all $z>z_r$). The overburden is an arbitrary inhomogenous medium.

A seismic source $x_s$ (13) is disposed in the overburden, at a depth less than the depth of the receiver. The seismic source emits both up-going and down-going seismic energy.

The inhomogenous nature of the overburden is indicated schematically by the presence of interfaces 10, 11, 12 within the overburden. The seismic properties of the overburden change at these interfaces. In the case of a marine seismic survey, the upper interface 12 might be the sea-surface (that is, an air/water interface). Because of the existence of these interfaces in the overburden, up-going seismic energy is reflected downwards in the overburden so that multiple events occur in the seismic data acquired at the receiver 14.

The seismic source $x_s$ (13) emits both S- and P-waves. The receiver $x_r$ (14) records receive S- and P-waves without distinction. The receiver may be any device that measures particle motion, such as particle displacement, particle velocity (the time derivative of particle displacement), or particle acceleration (the time derivative of particle acceleration). One commonly-used seismic receiver is a geophone, but the invention is not limited to processing seismic data acquired using one or more geophones as the receiver(s).

FIG. 3(b) illustrates an ideal seismic surveying arrangement that corresponds to FIG. 3(a). In the idealised arrangement of FIG. 3(b), the overburden is an homogenous medium, so that up-going seismic energy from the seismic source continues to propagate upwards and is not reflected downwards, so that seismic energy acquired at the receiver does not contain multiple events. The interfaces 10, 11 and 12 in the overburden of FIG. 3(a) have been illustrated in broken lines in FIG. 3(b) to emphasise that the overburden is homogenous in FIG. 3(b).

In the ideal seismic surveying arrangement of FIG. 3(b) the seismic source 13 is centred at a location $x_r^-$, which is at a depth $z_r^-$. The depth of the source, $z_r^-$, is at an infinitesimal distance E above the depth $z_r^-$ at which the receiver 14 is positioned. The distance E is vanishingly small.

FIG. 3(c) shows an alternative idealised seismic surveying arrangement. This corresponds to the idealised seismic surveying arrangement of FIG. 3(b), except that the positions of the seismic source 13 and the seismic receiver 14 have been interchanged. That is, in FIG. 3(c) the seismic source 13 is located at position $x_r$, at depth $z_r$, and the seismic receiver 14 is located at location $x_r^-$ at a depth $z_r^-$ which is a distance E above the depth $z_r$ of the source.

Since the seismic surveying arrangement of FIG. 3(c) is identical to the seismic surveying arrangement of FIG. 3(b) except that the positions of the source and receiver have been interchanged, the theorem of reciprocity requires that the seismic surveying arrangement shown in FIG. 3(b) will produce the same seismic data as the seismic surveying arrangement shown in FIG. 3(c).

In one embodiment of the invention, Betti's reciprocity theorem is used to transform actual seismic data required in a real seismic survey of the type shown in FIG. 3(a) into the seismic data that would be obtained in an idealised seismic survey of the type shown in FIG. 3(b). This enables the effect of the inhomogenous overburden to be eliminated, thereby eliminating multiple events.

The present invention also provides decomposition operators, that decompose the acquired seismic data into PP, PS, SP, and SS components.

Figure 1B:
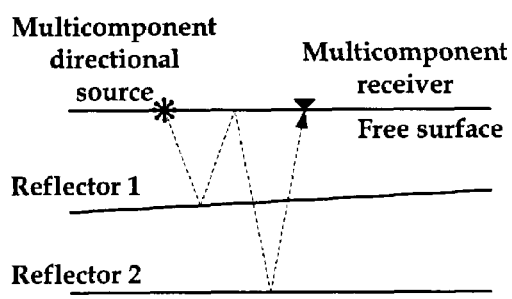
Figure 1D:
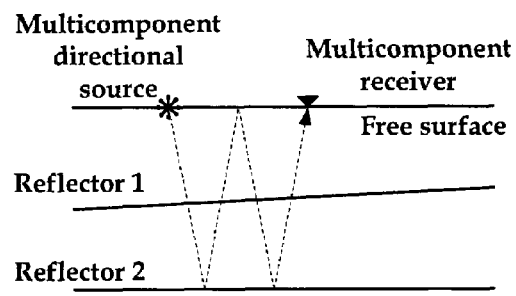
Figure 1C:
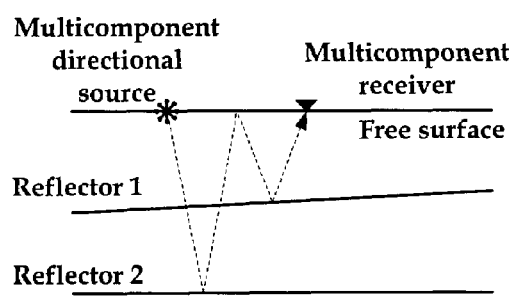

Betti's reciprocity theorem gives an integral equation relationship between two independent elastic wavefields that are defined in a specific volume enclosed by a mathematical or physical surface. The relationship between the two wavefields is governed by possible differences in the parameters of the medium, by possible differences in the source distribution, and by possible differences in boundary conditions. In the invention, Betti's theorem is used to provide an integral equation procedure that can be used to transform a wavefield that was recorded in an actual seismic survey with an overburden response (that is, a survey in which multiple reflections occur owing to an inhomogenous overburden) into wavefields that would have been recorded in an idealised hypothetical seismic experiment with the overburden response absence (the overburden in the hypothetical seismic surveying arrangement is homogenous and so produces no response). The present invention makes it possible to remove undesired events in the seismic data that arise owing to multiple reflections of the types shown in FIGS. 1(b) to 1(d), so that a multiple-free image can be obtained. The present invention enables all multiple reflections associated with any interface above or at the level of the receiver to be removed from the seismic data.

Other than the position of the source, or sources, the present invention does not require any source characteristics for the calculation to eliminate the waves scattered from the overburden. The radiation characteristics of the physical seismic source(s) is eliminated in the transformation from the physical seismic surveying arrangement to the idealised hypothetical seismic surveying arrangement. The source in the hypothetical idealised surveying arrangement is assumed to be a single point source that is generates components orthogonally oriented with respect to one another, and has a desired wavelet.

This embodiment of the method of eliminating the response of the overburden and the effect of the multi-component source radiation pattern from the acquired seismic data is referred to hereinafter as "Betti designature and elastic demultiple". A Betti designature and elastic demultiple method of the invention has the following advantages:

(a) It preserves the amplitude of the primary reflection while eliminating all events in the seismic data that arise owing to scattering of up-going energy in the overburden;
(b) It requires no knowledge of the medium below the depth of the receiver;
(c) It requires no knowledge of the medium above the depth of the receiver; and
(d) It requires information only about the local density and local velocities of elastic wave propagation at the depth of the receiver.

In a method of the present invention recorded seismic data are transformed to new, idealised data that would be recorded in a hypothetical seismic survey in which the overburden response was absent (that is in which the overburden was completely homogenous). The source in this hypothetical seismic survey is a point source, with some desired signature radiation characteristics (wavelet). In the processed data, the effect of the physical source and its radiation characteristics is absent. In other words, the new data have been designatured.

A method of the present invention may be applied to data obtained in any seismic survey that uses a multi-component seismic source and a multi-component seismic receiver. Three particular seismic surveying arrangements to which the invention can be applied are as follows:

A. A 3C×3C (or 9C) land seismic survey, in which the seismic source generates three orthogonal source motions (usually two horizontal source motions and one vertical source motion). The seismic wavefield is recorded by a receiver that contains three orthogonal geophones, deployed at or below the earth's surface. The three orthogonal geophones measure three orthogonal components of the particle velocity vector (usually the x-, y- and z-components).

B. A 3C×4C (or 12C) marine seismic survey, in which the seismic source generates three orthogonal source motions (usually two horizontal source motions and one vertical source motion). The seismic wavefield is recorded by a receiver that contains three orthogonal geophones, deployed just below the seabed and one hydrophone deployed just above the seabed. The three orthogonal geophones measure three orthogonal components of the particle velocity vector, and the hydrophone measures the pressure field (which is a scalar quantity).

C. A 3C×6C (18C) bore hole seismic experiment in which the seismic source again generates three separate orthogonal source motions. The source may be disposed on land, on the sea floor, or in the water column. The seismic receiver preferably measures three orthogonal components of the particle velocity, and three orthogonal components of the vertical traction vector or estimates thereof.

According to the invention, the de-multiple and de-signature operator is obtained from the down-going constituents of the acquired seismic data. This means that the measurements made at the receiver must be sufficient to allow the acquired wavefield to be decomposed at the receiver side into up-going and down-going wave constituents at the receiver. In the most general case, a proper wave field decomposition requires that the receiver measures the three components of the particle velocity vector as well as the three components of the vertical traction vector. For land seismic data, however, the vertical traction vector is zero, so that only the three components of the particle velocity vector need to be measured.

For ocean bottom seismic data, the two horizontal components of the vertical traction vector are zero, and the vertical component of the vertical traction vector just below the sea-bed is equal in magnitude and opposite in sign to the pressure field just above the sea floor. Thus, providing a hydrophone just above the sea-bed enables the vertical component of the vertical traction vector (which is the only non-zero component of the traction vector) to be determined.

Applying the present invention to a bore hole seismic survey requires, in principle, that the three components of the vertical traction vector must be measured or otherwise be known. In most cases, however, the three components of the vertical traction vector are not known. In order to overcome this, it is usual to record the three-component particle velocity at two different depths within the bore hole. Thus, the receiver system is essentially a six-component receiver system, so that a bore hole seismic survey may be considered to be an 18C survey.

Figure 2:
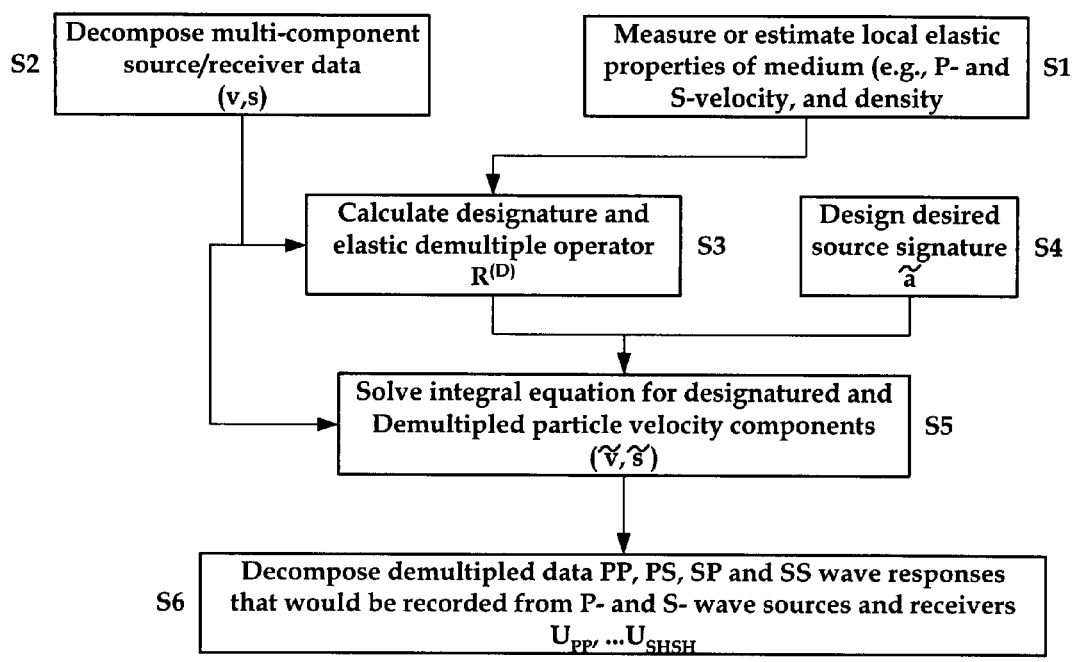
FIG. 2 is a flow diagram showing possible steps of a method of obtaining a de-signature and de-multiple operator according to an embodiment of the present invention.

FIG. 2 is a flow diagram showing the principal steps of a method according to the present invention.

The invention may be carried out on suitable pre-existing seismic data. In this case, the method would commence with the step (not shown) of retrieving suitable seismic data from storage. Alternatively, the method may commence with the step (not shown) of performing a multi-component source, multi-component receiver seismic survey to acquire suitable seismic data.

Initially at step S1 the local elastic properties of the medium in the vicinity of the receiver are determined. For a marine seismic survey, as one example, this step requires a determination of the local elastic properties of the sea-bed in the vicinity of the receiver. These properties may be determined from measurements, or they may be estimated from knowledge of the geological structure of the survey site.

At step S2, the multi-component seismic data that has been acquired or retrieved from storage is decomposed into up-going and down-going wavefield constituents. In principle step S2 could be carried out before, or simultaneously with, step S1. It is generally preferable to perform step Si before step S2, however, since the local elastic properties obtained from step Si may then be used to decompose the seismic data into up-going and down-going waves.

At step S3 the de-signature and de-multiple operator is calculated from the multi-component data and from the elastic properties of the medium.

At step S4 a desired signature for the seismic source is selected. This desired source signature, the multi-component data obtained at S2, and the operator calculated at S3 are then used to solve an integral equation to find the de-signatured and de-multipled wavefield, at step S5. In essence, S5 consists of transforming the seismic data obtained in a real seismic survey of the type shown in FIG. 3(a) into the data that would be obtained in an idealised seismic survey shown in FIG. 3(b). In a preferred embodiment Befti's theorem is used to transform the actual, measured wavefield enclosed by a surface S of the seismic surveying arrangement of FIG. 3(a) into the wavefield enclosed by the same surface S in the idealised seismic surveying arrangement of FIG. 3(b). The surface S is made up of the surfaces $\Sigma$ and $S_R$ shown in FIGS. 3(a) to 3(c). The surface $\Sigma$ is a horizontally plane surface that is located at depth $z_r^-$—that is, located an infinitesimal distance above the depth of the receiver (which is located at a depth $z_r$). The surface $S^R$ is a hemispherical surface having a radius of R.

In Step S5 the de-signature and de-multiple operator may be applied to the up-going wavefield constituents obtained at step S1. Alternatively, the de-signature and de-multiple operator may be applied to the seismic data as originally-acquired at the receiver.

Finally, at step S6, the de-signatured and de-multipled data is decomposed into the primary PP, PS, SP, and SS wave responses that would be recorded if pure P- and S-wave sources and pure P- and S-wave receivers had been used in the seismic survey.

In one embodiment, Step S6 has two principal operations. Initially, the multi-component data are Fourier transformed over horizontal receiver co-ordinates. The transformed data then undergo receiver side wave fields decomposition, in the wave number domain, into up-going pressure and shear wave fields. This is done by operating on the data by a receiver decomposition matrix. The decomposed data then undergoes a reverse Fourier transform, to give the up-going pressure and shear wave fields measured at the receiver.

The thus-obtained multi-component data are then Fourier transformed over horizontal source co-ordinates. The transformed data then undergoes source side wave field decomposition in the wave number domain, into down-going pressure and shear wave fields. This is done by operating on the data with a source decomposition matrix. The data then undergoes a reverse Fourier transform, to give the down-going pressure and shear wave fields emitted at the source.

The combined elastic wavefield decomposition on the source and receiver sides gives seismic data that are equivalent to data that would be obtained in an idealised survey in which the overburden response was absent, and in which single component P- or S-wave sources and single component P- or S-wave receivers were used.

A further advantage of the invention is that it removes, or at least significantly attenuates, ground-roll noise (in the case of a land-based seismic survey) or Scholte waves (in the case of a marine seismic survey). Ground roll noise is often the largest source of noise in a land-based seismic survey, so the removal of the effects of ground roll noise is highly desirable.

Step S6 can be omitted if desired. Alternatively, the step S6 of decomposing the data into the PP, PS, SP, and SS wavefields may be carried out before the step S5 of applying the de-signature and de-multiple operator. If the decomposition into PP, PS, SP and SS wavefields is done first, this step would replace the step S2 of decomposing the seismic data into up-going and down-going waves is not required.

If the medium in which the seismic survey is carried out is horizontally layered, the Betti designature and elastic demultiple scheme, followed by the elastic source-receiver decomposition scheme, is greatly simplified. It may be conveniently implemented in the tau-p domain or in the frequency-wave number domain.

The method is preferably carried out on common shot gathers, or on common receiver gathers when source array variations are negligible. In the latter domain the assumption of a layered earth may possibly degrade the results, but in most cases this is not very significant.

Once the seismic data has been corrected for the effects of the overburden and the source radiation characteristics using the de-signature and de-multiple method of the invention, and optionally has been decomposed into P-wave and/or S-wave constituents, it may then be subjected to further processing steps such as, for example, one or more conventional processing steps.

Figure 4:
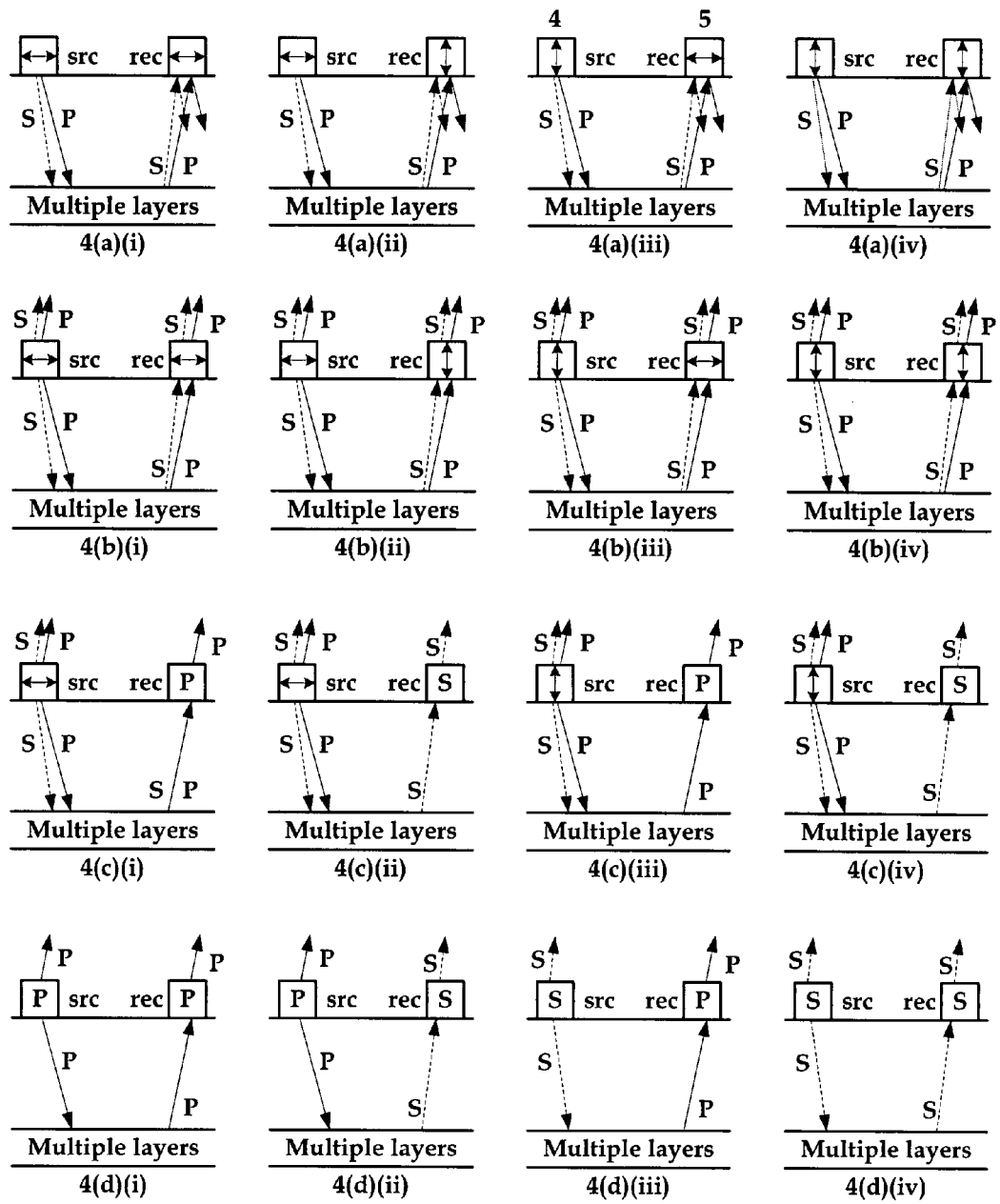
FIGS. 4(*a*) to 4(*d*) illustrate the effect of applying a method of the present invention to a land seismic survey.

FIG. 4 illustrates the effect of the present invention on a land seismic survey in which a multi component seismic source 4 and a multi-component seismic receiver 5 are disposed on the earth's surface.

FIG. 4(a) illustrates a real seismic survey. When the source 4 is actuated, down-going P- and S-waves are emitted. P-waves are denoted by solid lines, and S-waves are denoted by broken lines. The arrow in the box denoting the source (labelled "src") indicates the direction of source motion generated by the source. The seismic energy emitted from the source 4 undergoes reflection within the earth, and the up-going reflected waves are incident on the receiver 5. The receiver 5 contains at least two orthogonal geophones, and the arrow in the box denoting the receiver (labelled "rec") indicates the component of particle motion that is measured by the receiver. When the receiver records the wavefield at the earth's surface it records both p-waves and s-waves without distinction.

FIG. 4(a) shows four cases—
(i) the source generates a horizontal particle motion, and the receiver records particle motion in that horizontal direction;
(ii) the source generates a horizontal particle motion and the receiver records the vertical component of the received particle motion;
(iii) the source generates a vertical particle motion, and the receiver records a horizontal component of the received particle motion; and
(iv) the source generates a vertical particle motion, and the receiver records the vertical component of the received particle motion.

FIG. 4(b) illustrates the results of applying the de-signature and elastic de-multiple process to the data recorded in FIG. 4(a). That is, FIG. 4(b) shows the results after the seismic data acquired in the seismic surveying arrangement of FIG. 4(a) has been processed according to steps S1 to S5 of FIG. 2. The effect of this processing is to eliminate the response of the overburden (that is, the response of the earth's surface in this case) from the acquired seismic data. The processing also eliminates the effect of the radiation characteristics of the seismic source 5. The source is now a point source of seismic energy. In principle energy may propagate upwards past the source and receiver, since the overburden has been replaced by an infinite homogenous medium, and this is indicated in FIG. 4(b).

As noted above, the source 4 emits both P- and S-waves. In FIGS. 4(a) and 4(b), the receiver 5 records both S-waves and P-waves without distinction.

FIG. 4(c) illustrates the results of applying wave fields decomposition at the receiver side to the seismic data of the idealised hypothetical seismic surveying arrangement shown in FIG. 4(b). This has the effect of replacing the geophones used as the receiver in FIGS. 4(a) and 4(b) by a simulated pure P-wave detector (FIGS. 4(c)(i) and 4(c)(iii)), or by a simulated pure S-wave detector (FIGS. 4(c)(ii) and 4(c)(iv)).

Finally, FIG. 4(d) shows the results of further applying a source side wavefield decomposition. This has the effect of replacing the seismic source used in FIGS. 4(a) to 4(d), which emits both P-waves and S-waves, by a simulated pure P-wave source (FIGS. 4(c)(i) and 4(c)(ii))or by a simulated pure S-wave source (FIGS. 4(c)(ii) and 4(c)(iv)).

FIG. 4(d) illustrates the results of applying steps S1 to S6 of the embodiment shown in FIG. 2. As can be seen, the method has eliminated the overburden response, eliminated the radiation signature of the source, and has decomposed the acquired data into PP, PS, SP, and SS events.

Figure 5:
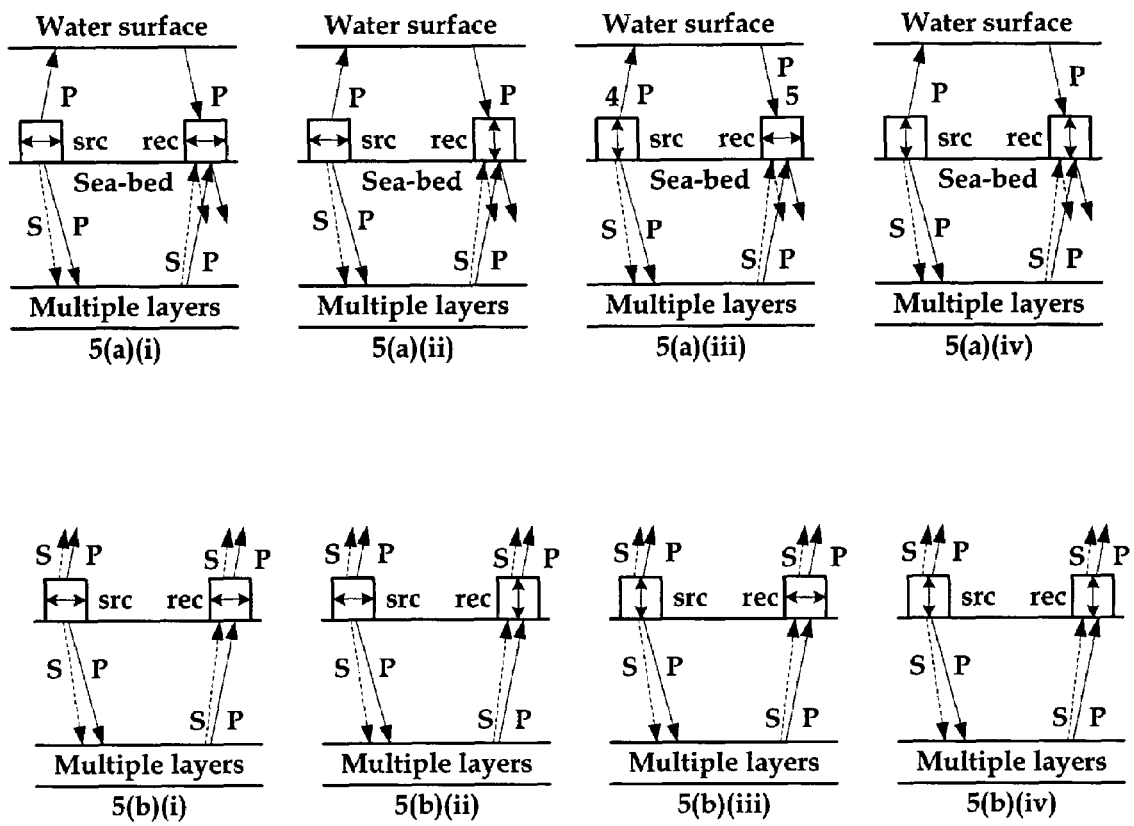
FIGS. 5(*a*) and 5(*b*) illustrates the effects of applying the method of the present invention to an ocean bottom seismic survey.

FIG. 5 illustrates the results of applying a method of the present invention to an ocean bottom seismic survey. In the surveying arrangement shown in FIG. 5(a) a seismic source 4 and a seismic receiver 5 are each disposed on the sea-bed. The arrow in the box denoting the source indicates the direction of source motion generated by the source. The receiver 5 contains at least two orthogonal geophones, and the arrow in the box denoting the receiver indicates the component of particle motion that is measured by the geophone. (A receiver used in a practical ocean bottom seismic survey may also contain a hydrophone, but this is not shown in FIG. 5.) The four combinations of horizontal and vertical direction of source motion and horizontal and vertical component of particle motion measured at the geophone shown in FIGS. 5(a)(i) to 5(a)(iv) correspond to the four cases shown in FIGS. 4(a)(i) to 4(a)(iv).

As can be seen in FIG. 5(a), the source emits down-going S-waves and P-waves, which undergo reflection within the earth so as to be incident upon the receiver 5. FIG. 5(a) also illustrates one possible water layer multiple path for seismic energy, in which upgoing P-waves are reflected at the water surface so as to be incident on the receiver 5.

The geophones in the receiver 5 measures the incident S-waves and P-waves without distinction.

FIG. 5(b) illustrates the effect of applying a de-signature and elastic de-multiple method of the present invention to the seismic data acquired in the seismic surveying arrangement shown in FIG. 5(a). As can be seen, the water layer multiple paths are eliminated, since the invention eliminates the response of the overburden (that is, the water layer in this case) from the acquired setsmic data. The method of the invention also eliminates the effect of the radiation signature of the source, and the source in the idealised seismic surveying arrangement of FIG. 5(a) is a point source of force.

FIG. 5(b) illustrates the effects of applying steps S1 to S5 shown in FIG. 1 to the seismic data acquired in the seismic surveying arrangement of FIG. 5(a). The effect of applying further steps of the invention—that is, applying the receiver side decomposition and the source side decomposition would provide identical results to those shown in FIGS. 4(c)(i) to 4(d)(iv).

Figure 6:
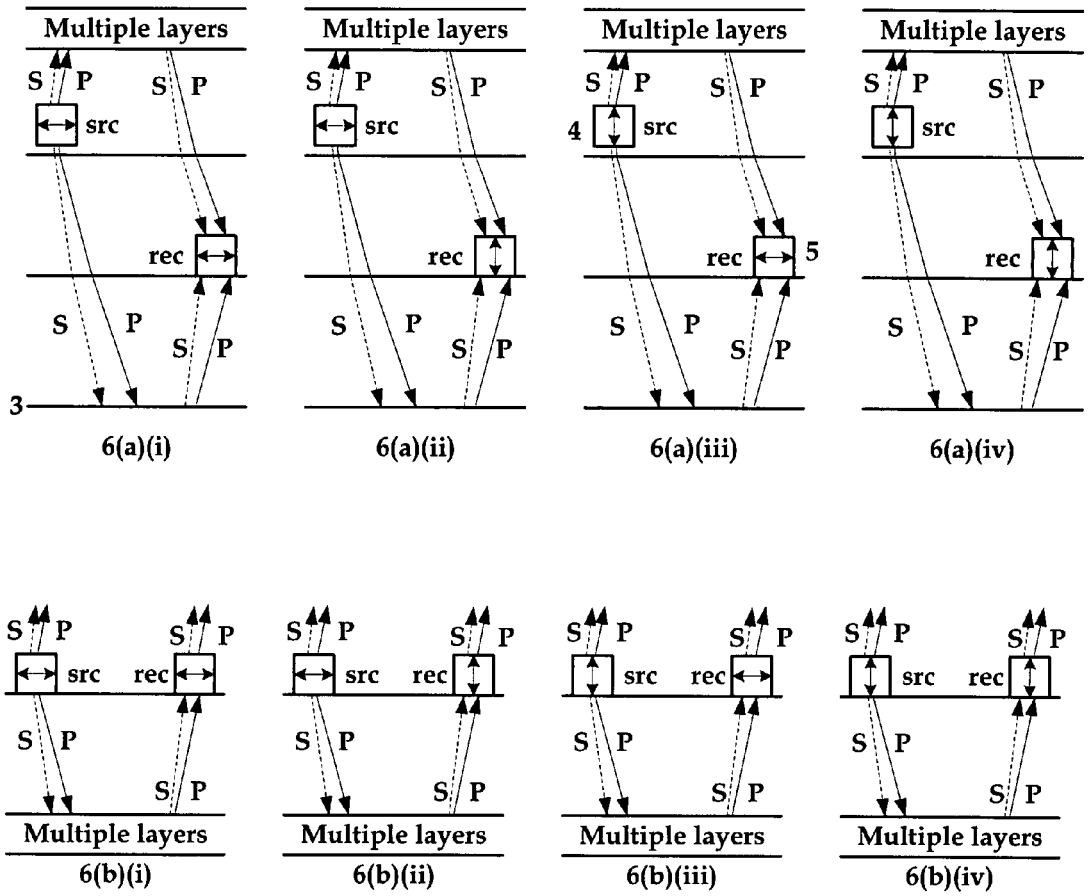
FIGS. 6(*a*) and 6(*b*) illustrate the effect of applying a method of the present invention to a land seismic survey in which the receiver is deployed within the earth's interior.
Figure 7:
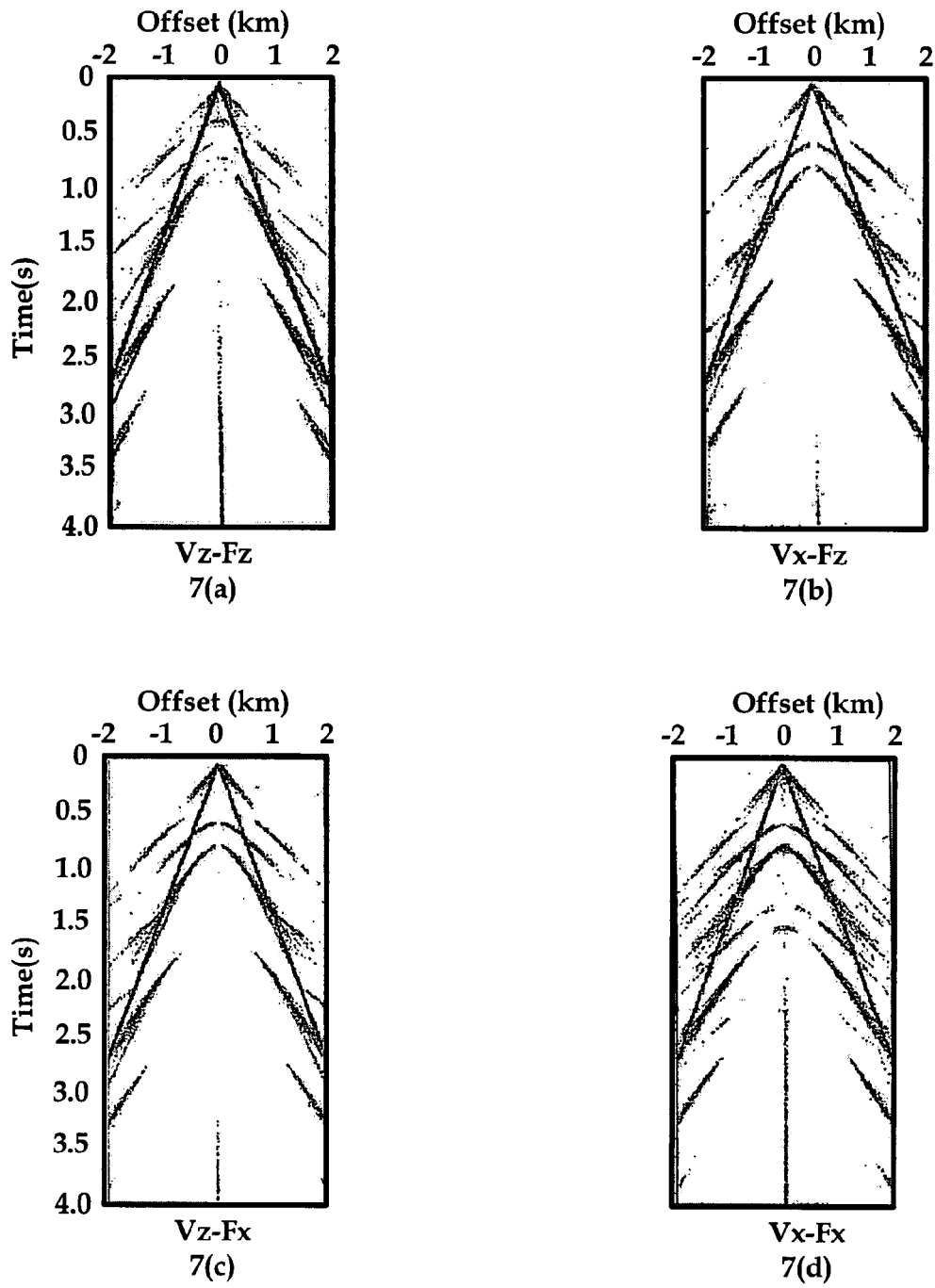
FIGS. 7(*a*) to 7(*d*) show raw synthetic seismic data.
Figure 8:
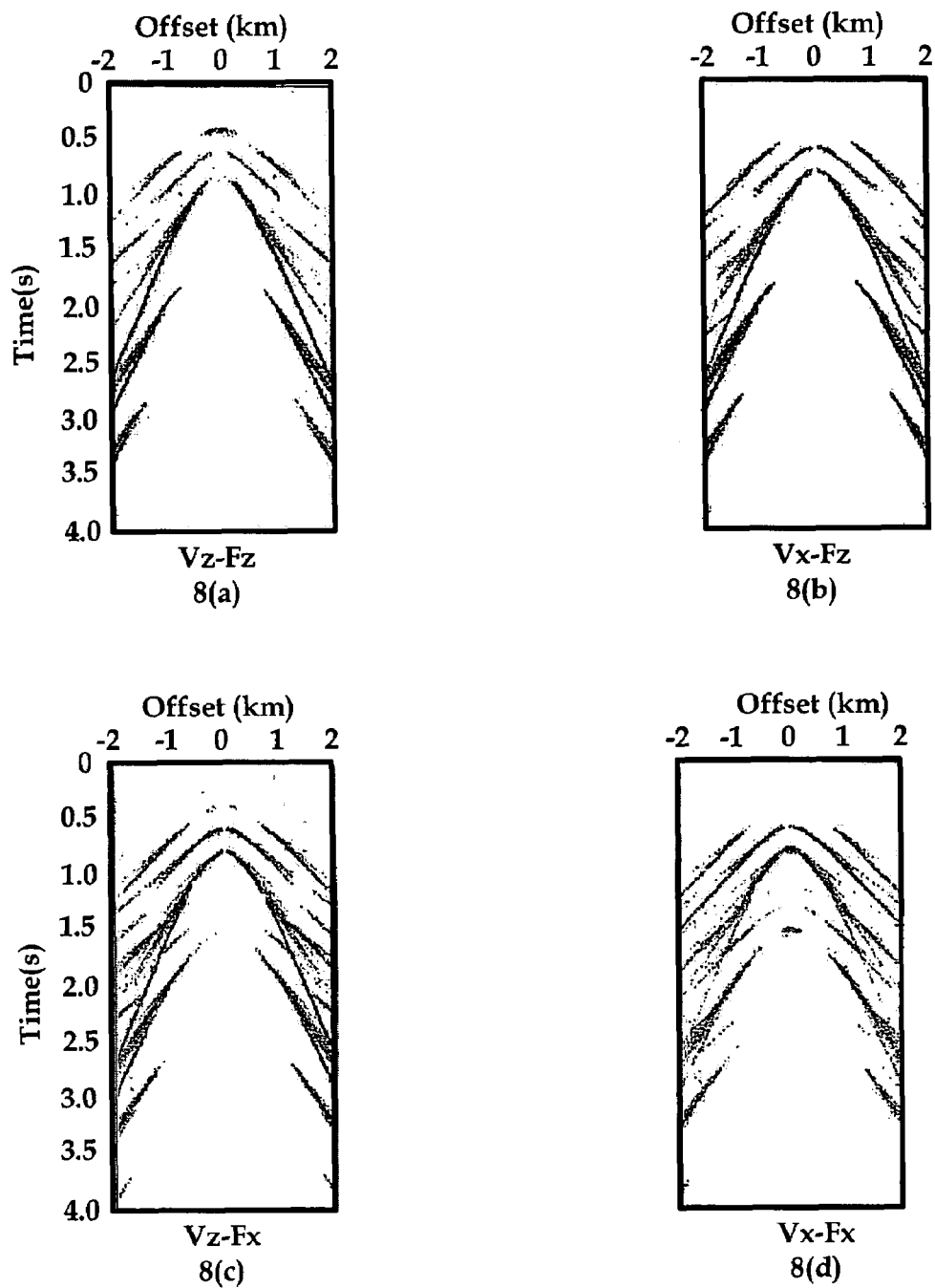
FIGS. 8(*a*) to 8(*d*) show the up-going component of the synthetic seismic data of FIGS. 7(*a*) to 7(*d*)
Figure 9:
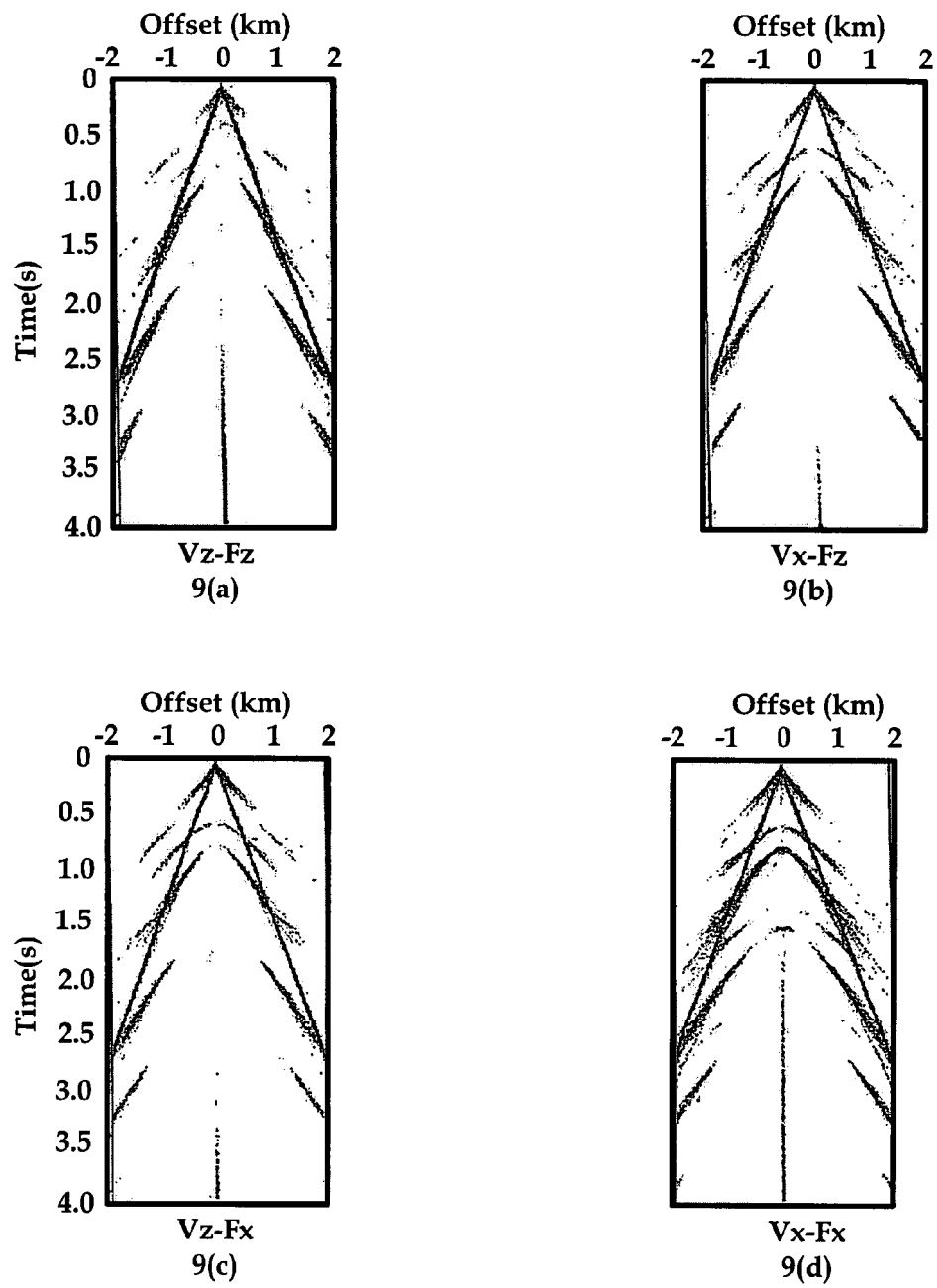
FIGS. 9(*a*) to 9(*d*) show the down-going part of the synthetic seismic data of FIGS. 7(*a*) to 7(*d*)
Figure 10:
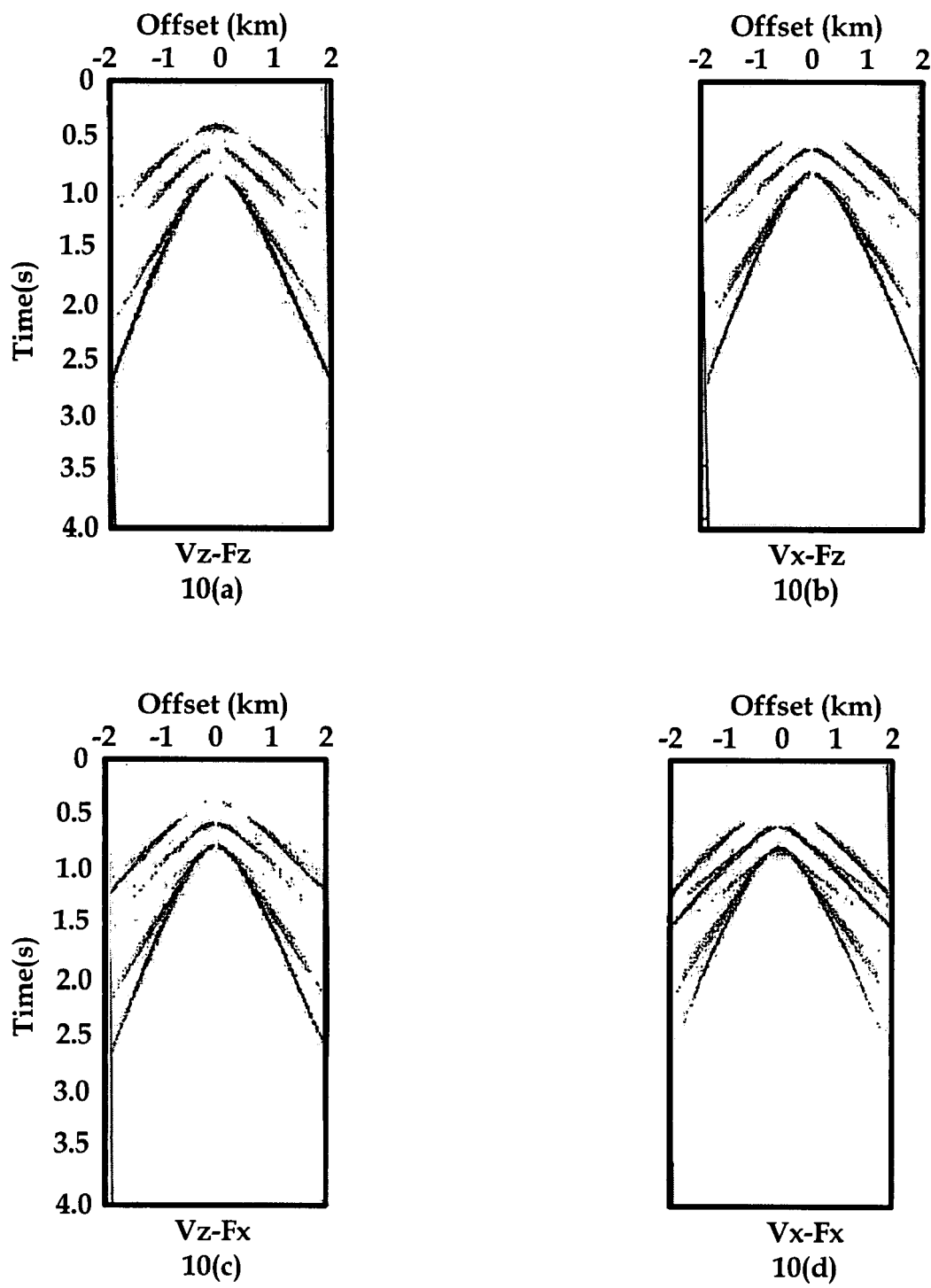
FIG. 10(*a*) to 10(*d*) show the particle velocities obtained from the synthetic seismic data of FIGS. 7(*a*) to 7(*d*) using a method of the present invention.
Figure 11:
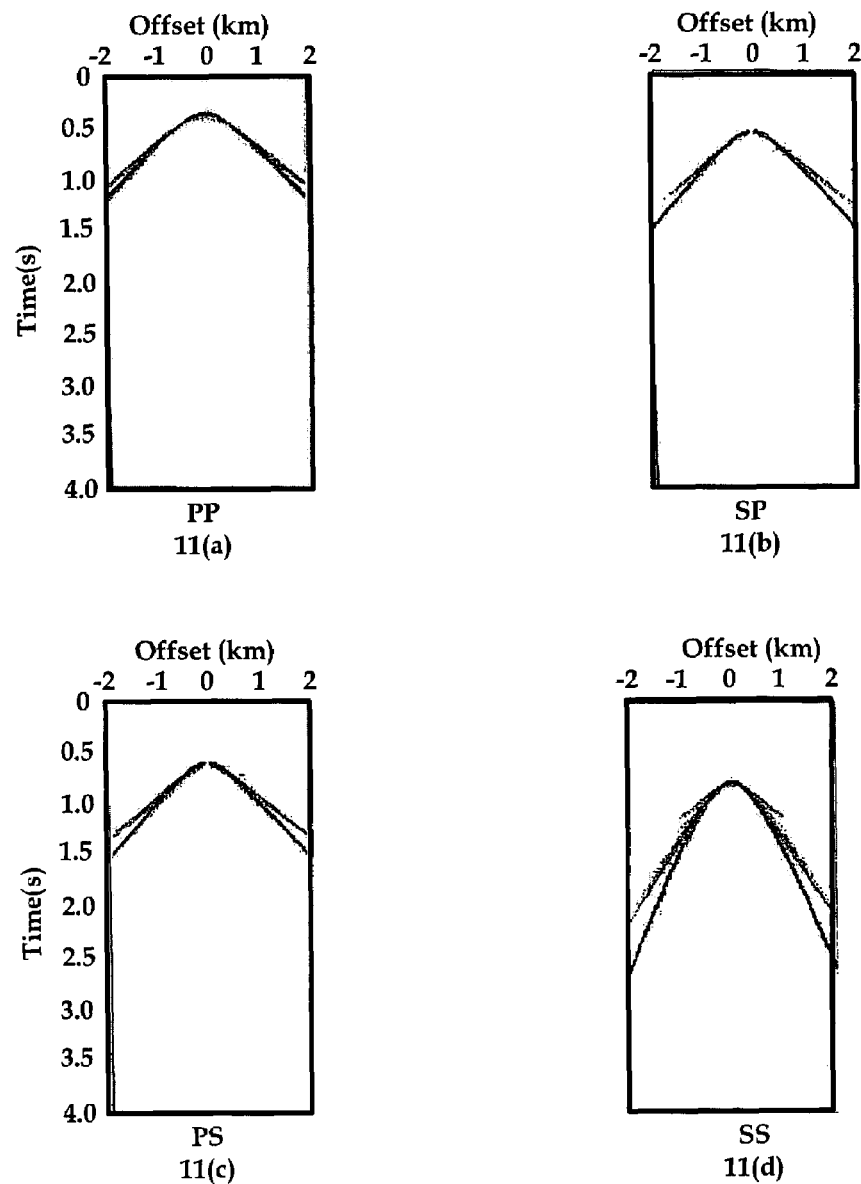
FIG. 11(*a*) to 11(*d*) show the PP, SP, PS and SS wavefields obtained from the synthetic seismic data of FIG. 7(*a*) to 7(*d*) using a method of the present invention.

FIG. 6(a) and 6(b) illustrate the results of applying the present invention to a land seismic survey which the receiver and source are deployed within the earth. In the seismic surveying arrangement shown in FIG. 6(a) the seismic source 4 and the seismic receiver 5 are both deployed within the earth, with the receiver being at a greater depth than the source. FIG. 6(a) illustrates the primary path of seismic energy from the source to the receiver, in which down-going S-waves and P-waves are reflected by a target reflector 3 so as to be incident on the receiver 5. FIG. 6(a) also shows unwanted multiple reflection paths in which up-going S-waves and P-waves undergo reflection in layers disposed above the source so as to be incident on the receiver.

In FIG. 6(a) the arrows in the box denoting the source 4 indicate the direction of source motion generated by the source. The arrows in the box indicating the receiver indicate the component of particle motion that is measured by a geophone contained in the receiver. As in FIGS. 4 and 5, the four combinations of horizontal and vertical source motion and horizontal and vertical geophone orientation are shown in FIG. 6(a)(i) to 6(a)(iv).

FIG. 6(b) illustrates the effect of applying the present invention to the seismic data acquired in the seismic survey arrangement of FIG. 6(a). As in FIGS. 4 and 5, the effect of applying a de-signature and de-multiple method of the invention to the data obtained in the seismic survey arrangement of FIG. 6(a) is to eliminate the effect of the overburden from the acquired seismic data. The effect of the radiation signature of the seismic source 5 is also eliminated. Thus, FIG. 6(b) illustrates an idealised seismic survey in which the overburden response is eliminated (corresponding to an homogenous overburden), and in which the seismic source 4 is a point source of force. FIG. 6(b) illustrates the results of applying steps S1 to S5 of FIG. 2 to the seismic data acquired in the real seismic surveying arrangement of FIG. 6(a).

The effect of applying a receiver side decomposition and a source decomposition would correspond to the results shown in FIGS. 4(c)(i) to 4(d)(iv) respectively.

FIGS. 7(a) to 11(d) illustrate results of applying the present invention to simulated seismic data.

FIGS. 7(a) to 7(d) shows raw simulated seismic data. This data was simulated for a land seismic survey in which the source and receiver are both located on the earth's surface. The seismic data was simulated using a reflectivity code of the type proposed by B. L. Kennett in "Seismic Wave Propagation in Stratefied Media" Cambridge University Press (1993). The model used to simulate the seismic data consists of a flat free surface on which the source and receiver are located. Below the free surface is a 300 m thick layer, having a flat lower interface. This layer is an isotropic elastic layer, with a P-wave velocity of 1800 m/s, and s-wave velocity of 800 m/s, and a density of 200 kg/m$^3$. Below this layer is an isotropic elastic infinite half space, having a p-wave velocity of 2500 m/s, an S-wave velocity of 1500 m/s, and a density of 2200 kg/m$^3$. Since the model is horizontally layered, it is necessary to consider a vertical source motion and one horizontal source motion, and to consider a geophone that records either a vertical component or a horizontal component of the particle motion. Thus, it is only necessary to consider a 2C×2C (4C) case, rather than the fall 3C×3C (9C) case.

In FIGS. 7(a) to 10(d), the notation $V_z$ and $V_x$ indicate vertical particle motion and horizontal particle motion at the receiver, respectfully. The terms $F_z$, and $F_x$, indicate that the geophone records the vertical component and a horizontal component of the particle motion, respectively.

FIG. 8(a) to 8(d) illustrates the up-going constituent of the raw data of FIGS. 7(a) to 7(d) respectively. FIGS. 9(a) to 9(d) show the down-going constituent of the raw seismic data of FIGS. 7(a) to 7(d) respectfully. FIGS. 8(a) to 9(d) were obtained by applying equations (A-28), (A-29), (A-32) and (A-33) below. The effect of the free surface is still present in FIGS. 8(a) to 9(d).

FIGS. 10(a) to 10(d) illustrate the effect on the seismic data of FIGS. 7(a) to 7(d) of removing the effects of the free surface and the source signature. This is done by applying a de-signature and de-multiple method of the present invention. That is, FIGS. 10(a) to 10(d) shows the effect of applying steps S1 to S5 of FIG. 2 to the raw seismic data shown in FIGS. 7(a) to 7(d), respectively. It can be seen that seismic events in FIGS. 7(a) to 7(d) that relate to multiple reflections have been eliminated from the seismic data shown in FIGS. 1 0(a) to 10(d).

The events in the seismic data of FIGS. 1 0(a) to 1 0(d) include all PP, PS, SP and SS events, as well as related head-waves.

FIGS. 1(a) to 11(d) illustrate the effect of applying a receiver-side decomposition and a source-side decomposition to the data shown in FIGS. 10(a) to 10(d), respectively. The effect of this is to decompose the seismic data into PP, SP, PS and SS events. The seismic data shown in each of FIGS. 11(a) to 11(d) includes only one event, together with the related head-waves.

The present invention has been described above with reference to a combined de-multiple & de-signature method. In an alternative embodiment, the invention provides a de-signature method only. In this alternative embodiment, the operator is computed from the down-going constituent of the initial arrival of seismic energy at the receiver. The initial arrival constitutes seismic energy that has travelled direct from the source to the receiver without undergoing any reflection, for example along the path 6 shown in FIG. 1(a). The incident part of the wavefield may be determined by, for example, the method proposed for acoustic or elastic earth by A. Weglein and B. G. Secrest in "Wavelet estimation for a multi-dimensional acoustic or elastic earth", Geophysics Vol. 55, pp 902-913 (1990).

Furthermore, if the signature/wavelet of the multicomponent source is known or can be estimated, the present invention may also be used to provide a de-multiple method only. The principal steps of such a method are to (a) obtain a combined de-signature and de-multiple operator according to a method of the invention, (b) obtain a de-signature operator from the known or estimated radiation characteristics of the seismic source and (c) obtain a de-multiple operator that will combine with the de-signature operator obtained at (b) to produce the combined de-signature and de-multiple operator obtained at (a).

A detailed mathematical description of one embodiment of the present invention will now be given.

Consider a volume V enclosed by the surface $S=\Sigma+S_R$ with outward-pointing normal vector n, as depicted in FIGS. 3(a) to 3(c). $\Sigma$ is a horizontal plane surface located at depth $z_r^-$ infinitesimally above the multicomponent receiver $x_r$ 14 located at depth level $z_r$. To simplify the analysis, it is assumed that the solid medium is homogeneous and isotropic at depth $z_r$ and in a infinitesimally thin region below depth $z_r$. The invention does not require knowledge of the properties of the overburden (at depths $z<z_r$) and the sub-surface (at depths $z>z_r$), and the overburden and sub-surface may both be arbitrarily inhomogeneous, anisotropic and anelastic media. When seismic data is acquired close to a physical surface, the receiver(s) is/are always infinitesimally below the physical surface. Physical surfaces typically are the surface of the earth (which is assumed to be a solid/vacuum surface), the ocean bottom (which is assumed to be a solid/fluid boundary), or another interface in the earth (assumed to be a solid/solid surface). $S_R$ is a hemispherical surface of radius R. The Cartesian coordinates will be denoted by $x=(\xi, x_3)$, where $\xi=(x_1, x_2)$. For notational convenience, $x_3=z$ will also be used. The $x_3$-axis, which is positive downwards, is parallel to n. The $x_1$, $x_2$-axes are in the $\Sigma$ plane.

Initially, an integral relationship is established between the multicomponent source, multicomponent receiver data acquired in a real seismic survey—these data contain the scattering response of the medium above the receivers—and the desired multicomponent source, multicomponent receiver data that would be obtained in an idealised seismic survey with that scattering response absent.

The seismic source used in the survey is assumed to separately generate three orthogonal source motions. The desired multicomponent data are those data that would be recorded in an idealised, hypothetical multicomponent seismic survey using three orthogonal point forces acting separately, with a desired, equal signature when the medium above the receivers is homogeneous and extends upwards to infimity, and has parameters equal to those of the medium at the receiver depth level. The overburden in the idealised survey thus is an elastic, isotropic halfspace. The geology below the receiver level is naturally the same in the physical and hypothetical seismic surveys.

TABLE 1

Notation for sources and fields entering the elastodynamic equations related to states P, H and Ĥ depicted in FIGS. 3(a) to 3(c), respectively.

|  | State P | State H | State Ĥ |
| --- | --- | --- | --- |
| Force component | $f_n(x_s)$ | $\tilde{a}\delta(x - x_r^-)\delta_{in}$ | $\tilde{a}\delta(x - x_r^-)\delta_{im}$ |
| Traction source | 0 | 0 | 0 |
| Particle velocity | $v_{mn}(x_r|x_s)$ | $\tilde{v}_{mn}(x_r|x_r^-)$ | $\hat{v}_{mn}(x_r^-|x_r)$ |
| Vertical traction | $s_{mn}(x_r|x_s)$ | $\tilde{s}_{mn}(x_r|x_r^-)$ | $\hat{s}_{mn}(x_r^-|x_r)$ |

In the physical survey, the seismic source is unidirectional, either a vibrator or a force. A vibrator source consists of one vertical vibrator (source of tensile stress) and two horizontally oriented vibrators (sources of shearing stress). The vibrator, located at position $x_s$ needs not be an ideal point source. Its source signature need not be known. In the hypothetical surveys H and Ĥ, the sources are point sources of force in the n and m direction, respectively, with source signature ã.

Consider the seismic survey with configuration as depicted in FIG. 3(a), which will be referred to as a "physical" seismic survey for convenience. The recorded m:th component of particle velocity vector at receiver location $x_r$, infinitesimally below $\Sigma$, due to a source acting in direction n at centre coordinate $x_s$ with unknown source strength and radiation pattern is denoted by $v_{mn}$. Likewise, the m:th component of vertical traction vector is denoted by $s_{mn}$. The source and field variables for the physical seismic survey, which is denoted for short "state P", are listed in Table 1. Note that the surface $\Sigma$ may or may not coincide with a physical surface. In the case that recording takes place just below the surface of the earth, or just below the ocean bottom, the surface $\Sigma$ obviously coincides with a physical surface.

The desired wavefields, $\tilde{v}_{mn}$ and $\tilde{s}_{mn}$ that it is proposed to solve for are the responses of the medium from three orthogonal point forces with desired signature ã when the medium above the receiver level is a halfspace as shown in FIG. 3(b). In this case, the surface $\Sigma$ is a non-physical boundary. The desired particle velocity and vertical traction vector responses are recorded at location $x_r$ infinitesimally below $\Sigma$ for the point forces located at $x_r^-$ on $\Sigma$. The source and field variables for this hypothetical seismic experiment which is denoted, for short, "state H", are listed in Table 1.

To establish the integral relationship between the physical state P and hypothetical state H seismic experiments the hypothetical "state Ĥ" is introduced. This is a further idealised seismic survey, and corresponds to the idealised seismic survey H if FIG. 3(b) except that the source 5 and the receiver 6 are interchanged with one another. Thus, the wavefields $\hat{v}_{mn}$ and $\hat{s}_{mn}$, in the hypothetical "state Ĥ" are the reciprocal wavefields to the ones in state H, and obey the reciprocity relation $$\hat{v}_{nm}(x_r^-|x_r)=\tilde{v}_{mn}(x_r|x_r^-), \quad (1)$$

$$\hat{s}_{nm}(x_r^-|x_r)=\tilde{s}_{mn}(x_r|x_r^-), \quad (2)$$

Thus, $\hat{v}_{mn}$ and $\hat{s}_{mn}$ are responses at location $x_r^-$ on surface $\Sigma$ due to a point force, with signature ã, acting in direction m at location $x_r$ infinitesimally below $\Sigma$ as depicted in FIG. 3(c). The surface $\Sigma$ is, as in the desired idealised state H, an artificial, non-physical boundary. Below, we shall use the fact that seismic data acquired in a survey in the hypothetical state Ĥ consist of upgoing events only scattered from the subsurface below $\Sigma$. In addition, the direct wavemodes from the sources to the receivers are upgoing events since the sources are ifinitesimally below the receivers. The source and field variables for state Ĥ are listed in Table 1.

Next Betti's reciprocity theorem is applied in the volume V enclosed by the surface $\Sigma+S_{R\to\infty}$, where $S_{R\to\infty}$ is located at infinity. Similarly to, for instance L. Amundsen et al. in "Elimination of free-surface related multiples without the need of the source wavelet", *Geophysics*, Vol 66, pages 327-341 (2000), a frequency-domain integral equation describing the relationship between state P and state Ĥ is obtained:

$$\tilde{a}v_{mn}(x_r|x_s)=\int dS(\xi)[\hat{s}_{im}(x|x_r)v_{in}(x|x_s)-\hat{v}_{im}(x|x_r)s_{in}(x|x_s)]. \quad (3)$$

The surface $S_R$ does not contribute to the integral as $R\to\infty$ (this is the radiation condition, see Y. H. Pao and V. Varatharajulu in "Huygen's Principle, radiation conditions and integral formulae for the scattering of elastic waves", *J. Acoust. Soc. Am.* Vol. 59, pp1361-1371 (1976)). Equation (3) can be simplified by identifying proper boundary conditions for $\Sigma$. In the physical state P, $v_{in}$ and $s_{in}$ are sums of up-going and down-going waves:

$$v_{in}=v_{in}^{(u)}+v_{in}^{(d)} \quad (4)$$

$$s_{in}=s_{in}^{(u)}+s_{in}^{(d)} \quad (5)$$

whereas in the hypothetical state Ĥ, $\hat{v}_{in}$ and $\hat{s}_{in}$ are purely up-going fields:

$$\hat{v}_{in}=\hat{v}_{in}^{(u)}; \hat{v}_{in}^{(d)}=0 \quad (6)$$

$$\hat{s}_{in}=\hat{s}_{in}^{(u)}; \hat{s}_{in}^{(d)}=0 \quad (7)$$

These boundary conditions are most conveniently introduced into equation (3) by analysing the problem in the horizontal wavenumber domain, where up-going and down-going waves and their relation to vertical traction and particle velocity vectors are explicitly known. Making use of Parceval's identity:

$$\int_{-\infty}^{\infty} d\xi f(\xi)h(\xi) = \frac{1}{(2\pi)^2}\int_{-\infty}^{\infty} d\kappa F(-\kappa)H(\kappa), \quad (8)$$

where wavenumber vector $\kappa=(k_1, k_2)$ is conjugate to $\xi=(x_1, x_2)$, equation (3) yields $$\tilde{a}v_{mn}(x_r \mid x_s) = \frac{1}{(2\pi)^2} \int d\kappa [\hat{S}_{in}(\kappa, z_r^- \mid x_r) V_{in}(-\kappa, z_r \mid x_s) - \hat{V}_{in}(\kappa, z_r^- \mid x_r) S_{in}(-\kappa, z_r \mid x_s)]. \quad (9)$$

Going from summation convention to vector notation, equation (9) is written $$\tilde{a}v_{mn}(x_r \mid x_s) = \frac{1}{(2\pi)^2} \int d\kappa [\hat{S}_m^T(\kappa, z_r^- \mid x_r) V_n(-\kappa, z_r \mid x_s) - \hat{V}_m^T(\kappa, z_r^- \mid x_r) S_n(-\kappa, z_r \mid x_s)], \quad (10)$$

where $\hat{S}^T = (S_1, S_2, S_3)$ and $\hat{V}^T = (V_1, V_2, V_3)$ are wavenumber domain vertical traction vector and particle velocity vector, respectively, and the superscript $T$ means transpose.

As shown in the Appendix, since the hypothetical state $\hat{H}$ fields $\hat{S}$ and $\hat{V}$ consist of up-going wave modes only, they are related as $$\hat{S}(\kappa) = \hat{L}_{SV}(\kappa)\hat{V}(\kappa), \quad (11)$$

where $\hat{L}_{SV}$ is a 3×3 matrix depending on the local medium parameters $\rho$, $\alpha$, $\beta$ along the receiver spread. The elements of $\hat{L}_{SV}$ are given in equation (A-19) in the appendix. Inserting equation (11) into equation (10) gives $$\tilde{a}v_{mn}(x_r \mid x_s) = \frac{1}{(2\pi)^2} \int d\kappa \hat{V}_m^T(\kappa, z_r^- \mid x_r) R_n^{(D)}(-\kappa, z_r \mid x_s), \quad (12)$$

where $$R^{(D)} = \hat{L}_{SV} V - S = G^{-1} V^{(D)} \quad (13)$$

is interpreted as the overburden response due to scattering in the medium above the receiver level. Furthermore, the vector $$V^{(D)} = [V_1^{(D)}, V_2^{(D)}, V_3^{(D)}]^T \quad (14)$$

contains the elements of the down-going wavemodes on each of the particle velocity components $V_1$, $V_2$, and $V_3$. Generally, for every shot location, $V^{(D)}$ is calculated in the slowness or wavenumber domain from the particle velocity vector and the vertical traction vector according to equations (A-29), (A-31) and (A-33). The elements of the resulting down-going reflection response are:

$$R_1^{(D)} = \frac{2\rho}{p^2 + q_\alpha q_\beta} \quad (15)$$

$$\{[q_\alpha - p_2^2 \beta^2 (q_\alpha - q_\beta)]V_1^{(D)} + p_1 p_2 \beta^2 (q_\alpha - q_\beta)V_2^{(D)}\}$$

-continued $$R_2^{(D)} = \frac{2\rho}{p^2 + q_\alpha q_\beta} \quad (16)$$

$$\{p_1 p_2 \beta^2 (q_\alpha - q_\beta)V_1^{(D)} + [q_\alpha - p_1^2 \beta^2 (q_\alpha - q_\beta)]V_2^{(D)}\}$$

$$R_3^{(D)} = \frac{2\rho q_\beta}{p^2 + q_\alpha q_\beta} V_3^{(D)}. \quad (17)$$

Re-introducing the summation convention, we obtain $$\tilde{a}v_{mn}(x_r \mid x_s) = \frac{1}{(2\pi)^2} \int d\kappa \hat{V}_{im}(\kappa, z_r^- \mid x_r) R_{in}^{(D)}(-\kappa, z_r \mid x_s). \quad (18)$$

Making use of Parceval's identity yields in the space domain $$\tilde{a}v_{mn}(x_r \mid x_s) = \int_\Sigma dS(\xi) \hat{v}_{im}(x \mid x_r) r_{in}^{(d)}(x \mid x_s), \quad (19)$$

where $r_{in}^{(d)}$ is the Fourier transform of $R_{in}^{(D)}$.

Equation (19) gives an integral relationship between the field $\hat{v}_{nm}$ in the hypothetical state $\hat{H}$ and the recorded field $v_{nm}$ in the state P. Note that no information, except location, about the physical source and its radiation characteristics, and no information of the properties of the physical overburden above the surface $\Sigma$ or the physical subsurface below the receiver level have been used to derive integral equations (19) for $\hat{v}_{nm}$. The hypothetical state H fields $\tilde{v}_{nm}$ are directly determined from reciprocity.

Observe that the inverse of $r_{in}^{(d)}$ in equation (19) can be interpreted as a multidimensional operator that acts as (i) a deterministic designature operator which removes the physical source characteristics, and (ii) a deterministic multiple attenuation operator that eliminates the overburden response from the physical data.

Eliminating the Incident Wavefield in the Hypothetical State

The desired field $\hat{v}_{nm}$ in the hypothetical experiment can be split into an incident wave field $\hat{v}_{nm}^{(inc)}$ propagating upwards from the source to the receiver, and the wavefield $\hat{v}_{nm}^{(sc)}$ scattered upwards from the subsurface:

$$\hat{v}_{nm} = \hat{v}_{nm}^{(inc)} + \hat{v}_{nm}^{(sc)}. \quad (20)$$

The incident wave field, which propagates in a homogeneous medium and thus is independent of source location, can be shown to be given by:

$$\hat{V}^{(inc)}(z_r^- \mid z_r) = \tilde{a} G \exp(-i\kappa \cdot \xi_r), \quad (21)$$

where G is the Green's tensor, equivalent to the tensor derived in equation (A-39) below. Observing that $$(\hat{V}^{(inc)})^T(\kappa, z_r^- | x_r) R^{(D)}(-\kappa, z_r | x_s) = \tilde{a} G^T(\kappa) G^{-1}(-\kappa) V^{(D)}(-\kappa) \exp(-i\kappa \cdot \xi_r), \quad (22)$$
$$= \tilde{a} V^{(D)}(-\kappa) \exp(-i\kappa \cdot \xi_r)$$

and $$v_{mn}^{(d)}(x_r | x_s) = \frac{1}{(2\pi)^2} \int d\kappa \exp(-i\kappa \cdot \xi_r) V_{mn}^{(D)}(-\kappa, z_r | x_s), \quad (23)$$

we obtain:

$$\tilde{a} v_{mn}^{(u)}(x_r | x_s) = \frac{1}{(2\pi)^2} \int d\kappa \hat{V}_{im}^{(sc)}(\kappa, z_r^- | x_r) R_{in}^{(D)}(-\kappa, z_r | x_s). \quad (24)$$

Making use of Parceval's identity yields in the space domain:

$$\tilde{a} v_{mn}^{(u)}(x_r | x_s) = \int_\Sigma dS(\xi) \hat{v}_{im}^{(sc)}(x | x_r) r_{in}^{(D)}(x | x_s). \quad (25)$$

Equation (25) gives the sought-after integral relationship between the scattered field $\hat{v}_{mn}^{(sc)}$ in the hypothetical state H survey and the up-going and down-going fields $v_{mn}^{(u)}$ and $v_{mn}^{(d)}$ in the state P. The scattered fields $\tilde{v}_{mn}^{(sc)}$ in the hypothetical state H are determined from the reciprocity relation.

Equation (25) is a Fredholm integral equation of the first kind for the desired scattered fields, leading to a system of equations that can be solved for $\hat{v}_{mn}^{(sc)}$ by keeping the receiver co-ordinate fixed while varying the source co-ordinate.

Wavenumber Domain Solution

Fourier transforming equation (25) over source coordinates $\xi_s$ and receiver coordinates $\xi_r$ yields $$\tilde{a} V_{mn}^{(U)}(\kappa_r, z_r | \kappa_s, z_s) = \quad (26)$$
$$\frac{1}{(2\pi)^2} \int d\kappa \hat{V}_{im}^{(sc)}(\kappa, z_r^- | \kappa_r, z_r) R_{in}^{(D)}(-\kappa, z_r | \kappa_s, z_s).$$

Equation (26) leads to a system of equations that can be solved for $\hat{V}_{mn}^{(sc)}$ by keeping the wavenumber conjugate to the receiver co-ordinate fixed while varying the wavenumber conjugate to the source co-ordinate. The coupling between positive wavenumbers in the down-going overburden response field with negative wavenumbers in the desired field (and vice versa) reflects the autocorrelation process between the two fields.

Decomposition into Primary PP, PS, SP, and SS Wave Responses

Following the Betti designature and elastic demultiple step is an elastic wavefield decomposition step that decomposes the multicomponent source, multicomponent receiver Betti designatured and elastic demultipled data $\hat{v}^{(sc)}(x_r^h | x_s^h)$ given in equation (25) into primary PP, PS, SP, and SS wave responses that would be recorded from pressure wave and shear wave sources and receivers. The receiver and source coordinates for the hypothetical data are denoted by $x_r^h$ and $x_s^h$, respectively, where $x_s^h$ is a point on the surface $\Sigma$ and $x_r^h = x_r$ is infinitesimally below. Let matrix $\hat{U}$ contain up-going potentials at the receiver from sources of force in direction i, $$\hat{U} = \begin{pmatrix} \hat{U}_{P1} & \hat{U}_{P2} & \hat{U}_{P3} \\ \hat{U}_{SV1} & \hat{U}_{SV2} & \hat{U}_{SV3} \\ \hat{U}_{SH1} & \hat{U}_{SH2} & \hat{U}_{SH3} \end{pmatrix}. \quad (27)$$

Let U be the matrix containing up-going P, SV, and SH wave potentials at the receiver excited from P, SV, and SH wave sources, $$U = \begin{pmatrix} U_{PP} & U_{PSV} & U_{PSH} \\ U_{SVP} & U_{SVSV} & U_{SVSH} \\ U_{SHP} & U_{SHSV} & U_{SHSH} \end{pmatrix}. \quad (28)$$

This elastic source-receiver wavefield decomposition may now be divided into two computational operations. First, the multicomponent data $\hat{v}^{(sc)}$ are Fourier transformed over horizontal receiver co-ordinates $\xi_r^h$. In the wavenumber domain $\kappa_r$, receiver side wavefield decomposition into upgoing pressure and shear wavefields is achieved by left-multiplying $\hat{V}^{(sc)}$ by a receiver decomposition matrix R, $$\hat{U}(\kappa_r, z_r^h | x_s^h) = R(\kappa_r) \hat{V}^{(sc)}(\kappa_r, z_r^h | x_s^h), \quad (29)$$

where $$R = \frac{1}{p^2 + q_\alpha q_\beta} \begin{pmatrix} p_1 & p_2 & -q_\beta \\ -\frac{p_1 q_\alpha}{p} & -\frac{p_2 q_\alpha}{p} & -p \\ -\frac{p_2}{p}(p^2 + q_\alpha q_\beta) & \frac{p_1}{p}(p^2 + q_\alpha q_\beta) & 0 \end{pmatrix}, \quad (30)$$

with $p = \kappa_r/\omega$. An inverse Fourier transform gives upgoing pressure and shear wavefields measured at the receiver $\hat{U}(x_r^h | x_s^h)$. Second, the multicomponent data $\hat{U}(x_r^h | x_s^h)$ are Fourier transformed over horizontal source co-ordinates $\xi_s^h$. In the wavenumber domain $\kappa_s$, source side wavefield decomposition into down-going pressure and shear source wavefields is achieved by right-multiplying the data by a source decomposition operator S, $$U(x_r^h | \kappa_s, z_s^h) = \hat{U}(x_r^h | \kappa_s, z_s^h) S(\kappa_s), \quad (31)$$

where $$S = \frac{-i\omega^{-1}\rho}{p^2 + q_\alpha q_\beta} \begin{pmatrix} p_1 & -\frac{p_1 q_\alpha}{p} & -\frac{p_2 q_\alpha}{p}\beta^2(p^2 + q_\alpha q_\beta) \\ p_2 & -\frac{p_2 q_\alpha}{p} & \frac{p_1 q_\alpha}{p}\beta^2(p^2 + q_\alpha q_\beta) \\ -q_\beta & -p & 0 \end{pmatrix}, \quad (32)$$

with $p=\kappa_s/\omega$. An inverse Fourier transform gives data U equivalent to data from a hypothetical survey with overburden absent, with single component pressure and shear wave sources, and single component pressure and shear wave receivers.

In $(\kappa_r, \kappa_s)$ space, the source-receiver decomposition is $$U(\kappa_r, z_r, {}^h|\kappa_s, z_s, {}^h) = R(\kappa_r)\hat{V}^{(sc)}(\kappa_r, z_r, {}^h|\kappa_s, z_s, {}^h)S(\kappa_s), \quad (33)$$

Observe that the decomposition operators are simply matrices which are multiplied by the data. The required parameters for the decomposition are the density, and P-wave and S-wave velocities at the receiver depth level.

Betti Deconvolution and Source-Receiver Wavefield Decomposition: Horizontally Layered Medium ("1.5D Medium")

In a horizontally layered medium, the response is laterally shift-invariant with respect to horizontal source location $\xi_s$, and the expressions therefore simplify significantly. For this reason, a horizontally layered medium is sometimes referred to as a "1.5D medium". Assuming a horizontally layered medium often yields satisfactory results for real data and realistic Earth structures.

Consider equation (24), where we may set $\xi_s=0$ and $$\hat{V}_{im}{}^{(sc)}(\kappa, z_r\text{-}|x_r) = \hat{V}_{im}{}^{(sc)}(\kappa, z_r\text{-}|\xi=0, z_r)\exp(-i\kappa\cdot\xi_r). \quad (34)$$

By Fourier transforming equation (24) with respect to $\xi_r$ and interchanging integrals, we find $$\tilde{a}V_{mn}^U(\kappa_r, z_r | \xi_s = 0, z_s) = \quad (35)$$

$$\frac{1}{(2\pi)^2}\int_{-\infty}^{\infty} d\kappa \hat{V}_{im}^{(sc)}(\kappa, z_r | \xi = 0, z_r) \times R_{in}^{(D)}(-\kappa, z_r^- | \xi_s = 0, z_s)$$

$$\int_{-\infty}^{\infty} d\xi_r \exp(-i\xi_r \cdot (\kappa + \kappa_r)).$$

The last integral is recognised as the Dirac delta function. Performing the integration over wavenumbers, using the Dirac delta function property, and renaming $\kappa_r$ by $\kappa$, we obtain $$\tilde{a}V_{mn}^U(\kappa, z_r|\xi_s=0, z_s) = \hat{V}_{im}^{(sc)}(-\kappa, z_r^-|\xi=0, z_r)R_{in}^{(D)}(\kappa, z_r^-|\xi_s=0, z_s) \quad (36)$$

Writing this result in terms of matrices, yields $$\begin{pmatrix} \hat{V}_{11}^{(sc)} & \hat{V}_{21}^{(sc)} & \hat{V}_{31}^{(sc)} \\ \hat{V}_{12}^{(sc)} & \hat{V}_{22}^{(sc)} & \hat{V}_{32}^{(sc)} \\ \hat{V}_{13}^{(sc)} & \hat{V}_{23}^{(sc)} & \hat{V}_{33}^{(sc)} \end{pmatrix}_{(-\kappa, z_r^-|z_r)} = \quad (37)$$

$$\tilde{a}\begin{pmatrix} V_{11}^{(U)} & V_{12}^{(U)} & V_{13}^{(U)} \\ V_{21}^{(U)} & V_{22}^{(U)} & V_{23}^{(U)} \\ V_{31}^{(U)} & V_{32}^{(U)} & V_{33}^{(U)} \end{pmatrix}_{(\kappa, z_r|z_r)} \begin{pmatrix} R_{11}^{(D)} & R_{12}^{(D)} & R_{13}^{(D)} \\ R_{21}^{(D)} & R_{22}^{(D)} & R_{23}^{(D)} \\ R_{31}^{(D)} & R_{32}^{(D)} & R_{33}^{(D)} \end{pmatrix}_{(\kappa, z_r|z_r)}$$

Using the field properties $$\hat{V}_{ij}^{(sc)}(-\kappa) = \begin{cases} \hat{V}_{ij}^{(sc)}(\kappa) & i = j \\ -\hat{V}_{ij}^{(sc)}(\kappa) & i \neq j \end{cases}. \quad (38)$$

it is evident that the scattered part of the desired field is obtained by generalised spectral deconvolution:

$$\begin{pmatrix} \hat{V}_{11}^{(sc)} & -\hat{V}_{21}^{(sc)} & -\hat{V}_{31}^{(sc)} \\ -\hat{V}_{12}^{(sc)} & \hat{V}_{22}^{(sc)} & -\hat{V}_{32}^{(sc)} \\ -\hat{V}_{13}^{(sc)} & -\hat{V}_{23}^{(sc)} & \hat{V}_{33}^{(sc)} \end{pmatrix}_{(\kappa, z_r^-|z_r)} = \quad (39)$$

$$\tilde{a}\begin{pmatrix} V_{11}^{(U)} & V_{12}^{(U)} & V_{13}^{(U)} \\ V_{21}^{(U)} & V_{22}^{(U)} & V_{23}^{(U)} \\ V_{31}^{(U)} & V_{32}^{(U)} & V_{33}^{(U)} \end{pmatrix}_{(\kappa, z_r|z_r)} \begin{pmatrix} R_{11}^{(D)} & R_{12}^{(D)} & R_{13}^{(D)} \\ R_{21}^{(D)} & R_{22}^{(D)} & R_{23}^{(D)} \\ R_{31}^{(D)} & R_{32}^{(D)} & R_{33}^{(D)} \end{pmatrix}^{-1}_{(\kappa, z_r|z_r)}$$

It follows from equation (39) that the components of the desired field are obtained by deterministic spectral deconvolution between the field itself and the reflection response of the overburden containing the down-going part of the particle velocity vector.

The next step is to decompose the Betti deconvolved data into primary PP, PS, SP, and SS wave responses. This is carried out as described in the section "Decomposition into primary PP, PS, SP, and SS wave responses".

Observe that the 1.5D Betti deconvolution scheme followed by source-receiver decomposition may be implemented as $\tau$–p or frequency-wavenumber domain algorithms. In the $\tau$–p domain, a joint designature, multiple attenuation and source-receiver decomposition process is performed for each p-trace. In the frequency-wavenumber domain, the process is performed for each combination of frequency and wavenumber.

Applications for the Present Invention

As noted above, the present invention can be applied to a number of different seismic survey configurations. Three survey scenarios of particular interest will be discussed briefly.

1. Land Surface Seismic Acquisition

The invention may be applied to a 3C×3C (or 9C) land seismic survey where three orthogonal source motions (two horizontal and one vertical) are generated separately, and where the seismic wavefield is recorded by three orthogonal geophones, measuring the two horizontal and the vertical components of the particle velocity vector.

For measurements located at the free surface, the up/down separation simplifies considerably: all tractions $S_1$, $S_2$, and $S_3$ vanish so that the traction terms vanish in equations (A-28) to (A-33) below.

2. Seabed Seismic Acquisition

The invention may be applied to seismic data acquired in a 3C×4C (or 12C) seabed seismic experiment where three orthogonal source motions (two horizontal and one vertical) are generated separately, either on the ocean bottom or in the water column, and where the seismic wavefield is recorded at a receiver location by three orthogonal geophones deployed just below the sea floor and one hydrophone deployed just above the sea floor.

For measurements located at the fluid/solid interface of the seabed, the up/down separation simplifies considerably: tractions $S_1$ and $S_2$ vanish so that the corresponding traction terms vanish in equations (A-28) to (A-33) below. The hydrophone measurement on the seafloor is the negative of $S_3$.

It is worthwhile to note that sources that are equivalent to sources of force can be generated in the water by using, for instance, a conventional airgun source. For instance, the response corresponding to a vertical point-force can be obtained by acquiring two records with the same source at the same location but at slightly different depths. A finite-difference approximation then allows us to compute the response due to a pressure gradient source in the vertical direction. The equation of motion (Newton's second law) shows that this is equivalent to a vertical point force. The same is true for the two horizontal directions, as well.

3. Borehole Seismic Acquisition

The 3C×6C (or 18C) borehole seismic experiment where the three orthogonal source motions are generated separately, either on land, on the sea floor, or in the water column, for which the three components of particle velocity and the three components of vertical traction are known.

In this surveying arrangement, there are no boundary conditions that simplify the up/down separation step. However, by adding hydrophones in the receiver package, additional constraints can be obtained (a hydrophone measures divergence of particle motion).

Wavenumber Domain Basic Relationships Between the Particle Velocity and Vertical Traction Vectors and Upgoing and Downgoing Wave Vectors This section considers a horizontally layered elastic earth. In a source-free region elastic wave propagation is described by the equation of motion and Hooke's law (the elastic constitutive relation). These can be written as a system of first-order ordinary differential equations of the form $$\partial_3 B = -i\omega A B \quad (A-1)$$

where the field vector B is defined $$B = (V^T, S^T)^T \quad (A-2)$$

with particle velocity vector $V^T = [V_1, V_2, V_3]$ and vertical traction vector $S^T = [S_1, S_2, S_3]$. The elastic system matrix A has the form $$A = \begin{pmatrix} 0 & 0 & p_1 \frac{1}{\mu} & 0 & 0 \\ 0 & 0 & p_2 & 0 & \frac{1}{\mu} & 0 \\ \frac{\lambda}{\lambda+2\mu} p_1 & \frac{\lambda}{\lambda+2\mu} p_2 & 0 & 0 & 0 & \frac{1}{\lambda+2\mu} \\ \rho - \theta p_1^2 - \mu p_\sigma p_\sigma & -\theta p_1 p_2 & 0 & 0 & 0 & \frac{\lambda}{\lambda+2\mu} p_1 \\ -\theta p_1 p_2 & \rho - \theta p_2^2 - \mu p_\sigma p_\sigma & 0 & 0 & 0 & \frac{\lambda}{\lambda+2\mu} p_2 \\ 0 & 0 & \rho & p_1 & p_2 & 0 \end{pmatrix} \quad (A-3)$$

where $\theta = \mu(3\lambda + 2\mu)/(\mu + 2\mu)$ and $p^2 = p_1^2 + p_2^2$.

For notational convenience, the explicit dependence of different quantities on frequency, wavenumber, depth, etc., is omitted. For instance, the particle velocity vector recorded at depth $x_3$, $v(\xi, x_3, \omega, x_s)$, due to a point source at location $x_s$ is in the wavenumber domain denoted V or $V(x_3)$ with the understanding $V = V(x_3) = V(\kappa, x_3, \omega, x_s)$. When required we will show dependency on horizontal slowness vector $p = \kappa/\omega = (p_1, p_2)$ Up-Going and Down-Going Waves For the decomposition of the elastic field into up- and down-going waves in a layered earth it is necessary to find the eigenvalues and eigenvectors of the system matrix A for given wavenumbers and frequencies. The field vector B can be decomposed into up-(U) and down-going (D) waves $$W = [U^T, D^T]^T \quad (A-4)$$

where $U^T = [U_P, U_{SV}, U_{SH}]$ and $D^T = [D_P, D_{SV}, D_{SH}]$, by the linear transformation $$B = LW \quad (A-5)$$

where L is the local eigenvector matrix of A (i.e., each column of L is an eigenvector). Equation (A-5) describes composition of the wavefield B from its upgoing and down-going constituents.

Given the inverse eigenvector matrix $L^{-1}$, the up- and downgoing waves can be computed by evaluating $$W = L^{-1} B. \quad (A-6)$$

Equation (A-6) describes decomposition of the wavefield B into upgoing and downgoing P- and S-waves. After some straightforward, but tedious calculations, the composition matrix is obtained $$L = L(p) = \begin{pmatrix} L_{VU}(p) & -L_{VU}(-p) \\ L_{SU}(p) & L_{SU}(-p) \end{pmatrix}, \quad (A-7)$$

and the decomposition matrix $$L^{-1} = L^{-1}(p) = \begin{pmatrix} L_{SU}^T(p) & L_{VU}^T(p) \\ -L_{SU}^T(-p) & L_{VU}^T(-p) \end{pmatrix}, \text{ where} \quad (A-8)$$

$$L_{VU} = \frac{1}{\sqrt{2}} \begin{pmatrix} -p_1 \frac{1}{\sqrt{\rho q_\alpha}} & \frac{p_1}{p} \sqrt{\frac{q_\beta}{\rho}} & \frac{p_2}{p} \frac{1}{\sqrt{\mu q_\beta}} \\ -p_2 \frac{1}{\sqrt{\rho q_\alpha}} & \frac{p_2}{p} \sqrt{\frac{q_\beta}{\rho}} & -\frac{p_1}{p} \frac{1}{\sqrt{\mu q_\beta}} \\ \sqrt{\frac{q_\alpha}{\rho}} & p \frac{1}{\sqrt{\rho q_\beta}} & 0 \end{pmatrix}, \quad (A-9)$$

-continued $$L_{SU} = \quad (A-10)$$

$$\frac{1}{\sqrt{2}} \begin{pmatrix} -2\mu p_1 \sqrt{\frac{q_\alpha}{\rho}} & \frac{p_1}{p}(\rho - 2\mu p^2)\frac{1}{\sqrt{\rho q_\beta}} & \frac{p_2}{p}\sqrt{\mu q_\beta} \\ -2\mu p_2 \sqrt{\frac{q_\alpha}{\rho}} & \frac{p_2}{p}(\rho - 2\mu p^2)\frac{1}{\sqrt{\rho q_\beta}} & -\frac{p_1}{p}\sqrt{\mu q_\beta} \\ (\rho - 2\mu p^2)\frac{1}{\sqrt{\rho q_\alpha}} & 2\mu p \sqrt{\frac{q_\beta}{\rho}} & 0 \end{pmatrix}.$$

In a source-free homogeneous solid upgoing and downgoing waves satisfy the differential equations:

$$\partial_3 U_P = -i\omega q_\alpha U_P, \quad (A-11)$$

$$\partial_3 U_{SV} = -i\omega q_\beta U_{SV}, \quad (A-12)$$

$$\partial_3 U_{SH} = -i\omega q_\beta U_{SH}, \quad (A-13)$$

$$\partial_3 D_P = i\omega q_\alpha D_P, \quad (A-14)$$

$$\partial_3 D_{SV} = i\omega q_\beta D_{SV}, \quad (A-15)$$

$$\partial_3 D_{SH} = i\omega q_\beta D_{SH}. \quad (A-16)$$

Traction-Particle Velocity Vector Relationship When Down-Going Waves Vanish

Using the relation (A-5) with $$D=0$$

one obtains a simple relationship between the vertical traction vector and the particle velocity vector, $$S = \hat{L}_{SV} V, \quad (A-17)$$

where $$\hat{L}_{SV} = \hat{L}_{SU} \hat{L}_{VU}^{-1}. \quad (A-18)$$

$$\hat{L}_{SV} = \frac{\rho}{p^2 + q_\alpha q_\beta} \begin{pmatrix} q_\alpha - p_2^2 \beta^2 (q_\alpha - q_\beta) & p_1 p_2 \beta^2 (q_\alpha - q_\beta) & p_1[1 - 2\beta^2(p^2 + q_\alpha q_\beta)] \\ p_1 p_2 \beta^2 (q_\alpha - q_\beta) & q_\alpha - p_1^2 \beta^2 (q_\alpha - q_\beta) & p_2[1 - 2\beta^2(p^2 + q_\alpha q_\beta)] \\ -p_1[1 - 2\beta^2(p^2 + q_\alpha q_\beta)] & -p_2[1 - 2\beta^2(p^2 + q_\alpha q_\beta)] & q_\beta \end{pmatrix} \quad (A-19)$$

Upgoing and Downgoing Waves Scaled as Particle Velocity and Vertical Traction

Upgoing and downgoing P, SV, and SH waves are not uniquely defined. We may scale the components so that they have dimensions of particle velocity or traction in such a way that their sum gives a component of particle velocity or a component of vertical traction. Let $V_i^{(Up)}$ denote the upgoing P-waves on $V_i$, $V_i^{(USv)}$ denote the upgoing SV-waves on $V_i$, etc. Then, $$V_i = V_i^{(UP)} + V_i^{(USV)} + V_i^{(USH)} + V_i^{(DP)} + V_i^{(DSV)} + V_i^{(DSH)}$$

with similar equation for vertical traction. Furthermore, it is possible to sum the upgoing components into a total upgoing component, and likewise for the downgoing components. $V_i^{(U)}$ is defined as the sum of upgoing waves on $V_i$, $$V_i^{(U)} = V_i^{(UP)} + V_i^{(USV)} + V_i^{(USH)},$$

and $V_i^{(D)}$ as the sum of downgoing waves on $V_i$, $$V_i^{(D)} = V_i^{(DP)} + V_i^{(DSV)} + V_i^{(DSH)}.$$

The total upgoing waves on $S_i$ are $$S_i^{(U)} = S_i^{(UP)} + S_i^{(USV)} + S_i^{(USH)},$$

and the total downgoing waves on $S_i$, $$S_i^{(D)} = S_i^{(DP)} + S_i^{(DSV)} + S_i^{(DSH)}.$$

Further, defining the vectors $$V^{(U)} = [V_1^{(U)}, V_2^{(U)}, V_3^{(U)}]^T \quad (A-20)$$

$$V^{(D)} = [V_1^{(D)}, V_2^{(D)}, V_3^{(D)}]^T \quad (A-21)$$

$$S^{(U)} = [S_1^{(U)}, S_2^{(U)}, S_3^{(U)}]^T \quad (A-22)$$

$$S^{(D)} = [S_1^{(D)}, S_2^{(D)}, S_3^{(D)}]^T \quad (A-23)$$

it follows that these vectors are related to the originally defined vectors of upgoing and downgoing waves, U and D, respectively, as $$V^{(U)}(p) = L_{VU}(p) U(p) \quad (A-24)$$

$$V^{(D)}(p) = -L_{VU}(-p) D(p) \quad (A-25)$$

$$S^{(U)}(p) = L_{SU}(p) U(p) \quad (A-26)$$

$$S^{(D)}(p) = L_{SU}(-p) D(p) \quad (A-27)$$

$V^{(D)}$ and $V^{(U)}$ enter the integral relationship between the physical experiment and the hypothetical experiment as known field vectors.

Explicitly, the total upgoing and downgoing waves on $V_1$ are given from $V_1$, $V_3$, and $S_1$ as $$V_1^{(U)} = \frac{1}{2}V_1 - \frac{p_1}{2q_\alpha}[1 - 2\beta^2(p^2 + q_\alpha q_\beta)]V_3 + \frac{1}{2\rho q_\alpha}(p^2 + q_\alpha q_\beta)S_1, \quad (A-28)$$

$$V_1^{(D)} = \frac{1}{2}V_1 + \frac{p_1}{2q_\alpha}[1 - 2\beta^2(p^2 + q_\alpha q_\beta)]V_3 - \frac{1}{2\rho q_\alpha}(p^2 + q_\alpha q_\beta)S_1. \quad (A-29)$$

Note that total up-going and down-going waves on $V_1$ do not depend on $V_2$, $S_2$, and $S_3$. Further, total up-going and down-going waves on $V_2$ are given from $V_2$, $V_3$, and $S_1$ as $$V_2^{(U)} = \frac{1}{2}V_2 - \frac{p_2}{2q_\alpha}[1 - 2\beta^2(p^2 + q_\alpha q_\beta)]V_3 + \frac{1}{2\rho q_\alpha}(p^2 + q_\alpha q_\beta)S_1, \quad (A-30)$$

$$V_2^{(D)} = \frac{1}{2}V_2 + \frac{p_2}{2q_\alpha}[1 - 2\beta^2(p^2 + q_\alpha q_\beta)]V_3 - \frac{1}{2\rho q_\alpha}(p^2 + q_\alpha q_\beta)S_1, \quad (A-31)$$

and are thus independent of $V_1$, $S_2$, and $S_3$. Total up-going and down-going waves on $V_3$ are given from $V_1$, $V_2$, $V_3$, and $S_3$ as $$V_3^{(U)} = \frac{1}{2}V_3 + \frac{1}{2\rho q_\beta}(p^2 + q_\alpha q_\beta)S_3 + \quad (A-32)$$

$$\frac{1}{2q_\beta}[1 - 2\beta^2(p^2 + q_\alpha q_\beta)](p_1 V_1 + p_2 V_2),$$

-continued $$V_3^{(D)} = \frac{1}{2}V_3 - \frac{1}{2\rho q_\beta}(p^2 + q_\alpha q_\beta)S_3 - \qquad (A-33)$$

$$\frac{1}{2q_\beta}[1 - 2\beta^2(p^2 + q_\alpha q_\beta)](p_1 V_1 + p_2 V_2).$$

Derivation of Matrix Relations

Equation (A-18) and symmetry relations of (A-19) yields $$[\hat{L}_{SV} V - S](p) = L_{VU}^{-T}(-p)L_{SU}^T(-p)V(p) - S(p) \qquad (A-34)$$
$$= L_{VU}^{-T}(-p)[L_{SU}^T(-p)V(p) - L_{VU}^T(-p)S(p)]$$

The last term in the square brackets is identified by use of equations (A-6) and (A-8) as the downgoing wave vector calculated from V and S according to $$D(p) = L_{SU}^T(-p)V(p) - L_{VU}^T(-p)S(p) \qquad (A-35)$$

In the previous subsection, it was shown that D was related to the down-going particle ave vector V(D) by equations (A-28) and (A-29). Inverting this equation gives $$D(p) = -L_{VU}^{-1}(-p)V^{(D)}(p), \qquad (A-36)$$

which is substituted into equation (A-34) to give $$[\hat{L}_{SV} V - S](p) = L_{VU}^{-T}(-p)L_{VU}^{-1}(-p)V^{(D)}(p) \qquad (A-37)$$
$$= [L_{VU}(-p)L_{VU}^T(-p)]^{-1} V^{(D)}(p),$$
$$= G^{-1}(p)V^{(D)}(p)$$

where $$G^{-1} = \frac{1}{2}(L_{VU} L_{VU}^T)^{-1}. \qquad (A-38)$$

Explicitly, it is found that $$G^{-1} = \frac{2\rho}{p^2 + q_\alpha q_\beta} \begin{pmatrix} q_\alpha - p_2^2 \beta^2 (q_\alpha - q_\beta) & p_1 p_2 \beta^2 (q_\alpha - q_\beta) & 0 \\ p_1 p_2 \beta^2 (q_\alpha - q_\beta) & q_\alpha - p_1^2 \beta^2 (q_\alpha - q_\beta) & 0 \\ 0 & 0 & q_\beta \end{pmatrix}. \qquad (A-39)$$

In the theory given above it has been assumed that the sources in the idealised survey are point sources of force. However, the invention is not limited to the use of sources in the idealised survey which are point sources of force, although the detailed theory given above requires slight modification to accommodate sources in the idealised survey that are not point sources of force.

In the detailed description given above the designature/demultiple operator is derived using Betti's theorem. The invention is not however limited to deriving the designature/demultiple operator using Betti's theorem. The designature/demultiple operator of the invention may be derived from the elastodynamic wave equation or a representation of the elastodynamic wave equation. Betti's theorem is an integral representation of the elastodynamic wave equation, and examples of other representations of the elastodynamic wave equation include the elastic Kirchhoff integral or the elastodynamic representation theorem, and the inverse scattering series method.

Figure 12:
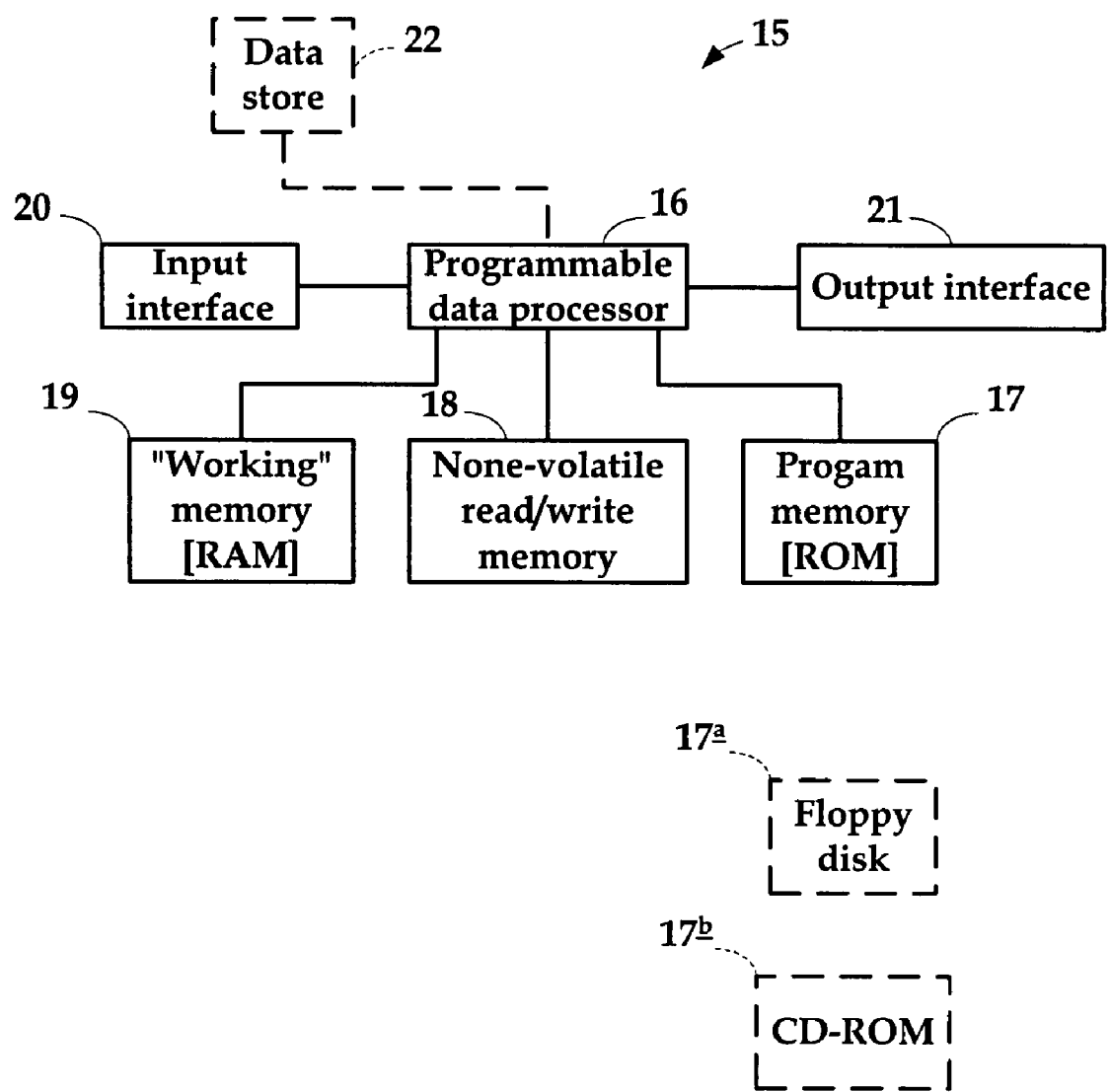
FIG. 12 is block schematic view of an apparatus according to the invention.

FIG. 12 is a schematic block diagram of an apparatus 15 according to the present invention. The apparatus is able to carry out a method according to the present invention.

The apparatus 15 comprises a programmable data processor 16 with a program memory 17, for instance in the form of a read only memory ROM, storing a program for controlling the data processor 17 to perform a method of the invention. The system further comprises non-volatile read/write memory 18 for storing, for example, any data which must be retained in the absence of power supply. A "working" or "scratchpad" memory for the data processor is provided by a random access memory (RAM) 19. An input device 20 is provided, for instance for receiving user commands and data. An output device 21 is provided, for instance for displaying information relating to the progress and result of the method. The output device may be, for example, a printer, a visual display unit or an output memory.

Seismic data for processing according to a method of the invention may be supplied via the input device 20 or may optionally be provided by a machine-readable store 22.

The program for operating the system and for performing the method described hereinbefore is stored in the program memory 17, which may be embodied as a semi-conductor memory, for instance of the well-known ROM type. However, the program may be stored in any other suitable storage medium, such as magnetic data carrier 17a (such as a "floppy disc") or CD-ROM 17b.

The invention claimed is:

1. A computer-implemented method of processing multi-component seismic data, the data having been acquired by emitting multi-component seismic energy at a source location; and acquiring seismic data at a multi-component seismic receiver located at a greater depth than the source location, the method comprising the steps of:
   decomposing the acquired seismic data into up-going constituents and down-going constituents;
   calculating a de-signature and de-multiple operator from the down-going constituents of the acquired seismic data and from properties of the medium surrounding the receiver; and
   processing the acquired seismic data using the de-signature and de-multiple operator.

2. A method as claimed in claim 1 wherein processing the acquired seismic data includes processing the acquired seismic data using the de-signature and de-multiple operator to attenuate or remove seismic events arising from multiple reflections; to remove the effects of overburden from the acquired seismic data; or to attenuate or remove the effects of the source signature.

3. A method as claimed in claim 2 wherein the step of processing the acquired seismic data comprises processing the up-going constituents of the acquired seismic data using the de-signature and de-multiple operator.

4. A method as claimed in claim 2 wherein the step of processing the acquired seismic data further comprises selecting a desired seismic signature for the source.

5. A method as claimed in claim 2 and comprising the further step of decomposing the processed seismic data into P-wave and/or S-wave data.

6. A method as claimed in claim 5 wherein the step of decomposing the seismic data into P-wave and/or S-wave data comprises decomposing the data at the receiver side.

7. A method as claimed in claim 5 wherein the step of decomposing the seismic data into P-wave and/or S-wave data comprises decomposing the data at the source side.

8. A method as claimed in claim 1 and comprising the step of decomposing the acquired seismic data into P-wave and/or S-wave data, the step of decomposing the acquired seismic data into P-wave and/or S-wave data being performed before the step of decomposing the seismic data into up-going constituents and down-going constituents.

9. A computer-implemented method as claimed in claim 1 and further comprising the step of receiving the acquired data.

10. A computer-implemented method of processing multi-component seismic data, the data having been acquired by emitting multi-component seismic energy at a source location; and acquiring seismic data at a multi-component seismic receiver located at a greater depth than the source location, the method comprising the steps of:
  decomposing the acquired seismic data into up-going constituents and down-going constituents;
  calculating a de-signature operator from the initial down-going constituents of the acquired seismic data and from properties of the medium surrounding the receiver; and
  processing the acquired seismic data using the de-signature operator.

11. A method as claimed in claim 10 wherein processing the acquired seismic data using the de-signature and de-multiple operator includes processing the seismic data to attenuate or remove seismic events arising from multiple reflections; to remove the effects of overburden from the acquired seismic data; or to attenuate or remove the effects of the source signature.

12. A computer-implemented method as claimed in claim 10 and further comprising the step of receiving the acquired data.

13. A computer-implemented method of processing multi-component seismic data, the data having been acquired by emitting multi-component seismic energy at a source location; and acquiring seismic data at a multi-component seismic receiver located at a greater depth than the source location, the method comprising the steps of:
  decomposing the acquired seismic data into PP-constituents, PS-constituent, SP-constituents and SS-constituents;
  calculating a de-signature and de-multiple operator from the constituents of the acquired seismic data and from properties of the medium surrounding the receiver; and
  processing the acquired seismic data using the de-signature and de-multiple operator.

14. A method as claimed in claim 13 wherein processing the acquired seismic data includes processing the acquired seismic data using the de-signature and de-multiple operator to attenuate or remove seismic events arising from multiple reflections; to remove the effects of overburden from the acquired seismic data; or to attenuate or remove the effects of the source signature.

15. A computer-implemented method as claimed in claim 13 and further comprising the step of receiving the acquired data.

16. An apparatus for processing multi-component seismic data, the date having been acquired by emitting multi-component seismic energy at a source location; and acquiring seismic data at a multi-component seismic receiver located at a greater depth than the source location, the apparatus comprising:
  means for decomposing the acquired seismic data into up-going constituents and down-going constituents;
  means for calculating a de-signature and de-multiple operator from the down-going constituents of the acquired seismic data and from properties of the medium surrounding the receiver; and
  means for processing the acquired seismic data using the de-signature and de-multiple operator.

17. An apparatus as claimed in claim 16 wherein the means for processing the acquired seismic data includes means for processing the acquired seismic data using the de-signature and de-multiple operator to attenuate or remove seismic events arising from multiple reflections; to remove the effects of overburden from the acquired seismic data; or to attenuate or remove the effects of the source signature.

18. An apparatus as claimed in claim 17 wherein the means for processing the acquired seismic data includes means for processing the up-going constituents of the acquired seismic data using the de-signature and de-multiple operator.

19. An apparatus as claimed in claim 17 and further comprising means for decomposing the processed seismic data into P-wave and/or S-wave data.

20. An apparatus as claimed in claim 19 and further comprising means for decomposing the seismic data into P-wave and/or S-wave data at the receiver side.

21. An apparatus as claimed in claim 19 and further comprising means for decomposing the seismic data into P-wave and/or S-wave data at the source side.

22. An apparatus as claimed in claim 16 and further comprising means for selecting a desired seismic signature for the source.

23. An apparatus as claimed in claim 16 and comprising a programmable data processor.

24. A storage medium containing a program for a data processor of an apparatus as defined in claim 23.

25. An apparatus for processing multi-component seismic data, the data having been acquired by emitting multi-component seismic energy at a source location; and acquiring seismic data at a multi-component seismic receiver located at a greater depth than the source location, the apparatus comprising:
  means for decomposing the acquired seismic data into up-going constituents and down-going constituents;
  means for calculating a de-signature operator from the initial down-going constituents of the acquired seismic data and from properties of the medium surrounding the receiver; and
  means for processing the acquired seismic data using the de-signature operator.

26. A method as claimed in claim 25 wherein the means for processing the acquired seismic data includes means for processing the acquired seismic data using the de-signature and de-multiple operator to attenuate or remove seismic events arising from multiple reflections; to remove the effects of overburden from the acquired seismic data; or to attenuate or remove the effects of the source signature.

27. An apparatus for processing multi-component seismic data, the data having been acquired by emitting multi-component seismic energy at a source location; and acquiring seismic data at a multi-component seismic receiver located at a greater depth than the source location, the apparatus comprising:
  means for decomposing the acquired seismic data into PP-constituents, PS-constituent, SP-constituents and SS-constituents;

means for calculating a de-signature and de-multiple operator from the constituents of the acquired seismic data and from properties of the medium surrounding the receiver; and means for processing the acquired seismic data using the de-signature and de-multiple operator.

28. A method as claimed in claim 27 wherein the means for processing the acquired seismic data includes means for processing the acquired seismic data using the de-signature and de-multiple operator to attenuate or remove seismic events arising from multiple reflections; to remove the effects of overburden from the acquired seismic data; or to attenuate or remove the effects of the source signature.

* * * * *